United States Patent
Fujiyoshi et al.

(10) Patent No.: US 6,611,928 B1
(45) Date of Patent: Aug. 26, 2003

(54) HOMO-CODE CONTINUITY PROOF TESTING DEVICE

(75) Inventors: Shinichi Fujiyoshi, Fukuoka (JP); Kazuhiro Uchida, Fukuoka (JP); Kazuya Ryu, Fukuoka (JP); Katsuhiko Hirashima, Fukuoka (JP); Toshinori Koyanagi, Kawasaki (JP); Setsuo Abiru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 09/703,690

(22) Filed: Nov. 1, 2000

(30) Foreign Application Priority Data

Jan. 7, 2000 (JP) ........................................ 2000-001990

(51) Int. Cl.⁷ .............................................. G06F 11/00
(52) U.S. Cl. ........................................ 714/715; 714/738
(58) Field of Search ................................ 714/738, 715, 714/758, 752, 744, 710; 324/76.11

(56) References Cited

U.S. PATENT DOCUMENTS

| | | | | |
|---|---|---|---|---|
| 4,736,424 A | * | 4/1988 | Busby | .................... 714/701 |
| 5,341,399 A | * | 8/1994 | Eguchi | .................... 324/76.11 |
| 6,073,263 A | * | 6/2000 | Arkin et al. | ................. 714/738 |

FOREIGN PATENT DOCUMENTS

JP          2000068950           3/2000

* cited by examiner

*Primary Examiner*—Phung M. Chung
(74) *Attorney, Agent, or Firm*—Katten Muchin Zavis Rosenman

(57) ABSTRACT

In a homo-code continuity proof testing device for testing with test data including a predetermined homo-code continuity proof test pattern, a testing device on a transmitting side synchronizes the test data in the form of a frame, including a predetermined test pattern, a data synchronous pattern, an error detecting pattern, and preferably a frame synchronous pattern for testing a homo-code continuity proof strength, with a predetermined clock, to be transmitted. A tested device on a receiving side extracts a clock included in the test data, detects the data synchronous pattern, the error detecting pattern, and the frame synchronous pattern in synchronization with the extracted clock, and determines a homo-code continuity proof test by the detection/undetection of each pattern.

23 Claims, 18 Drawing Sheets

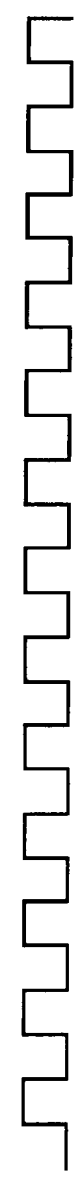
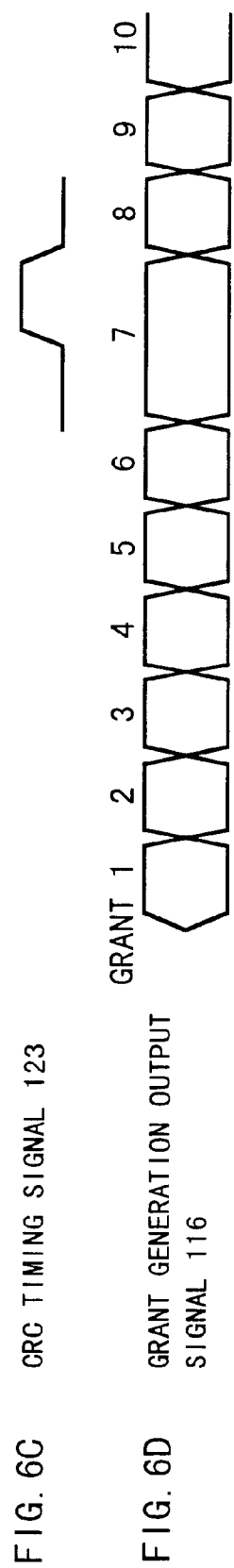
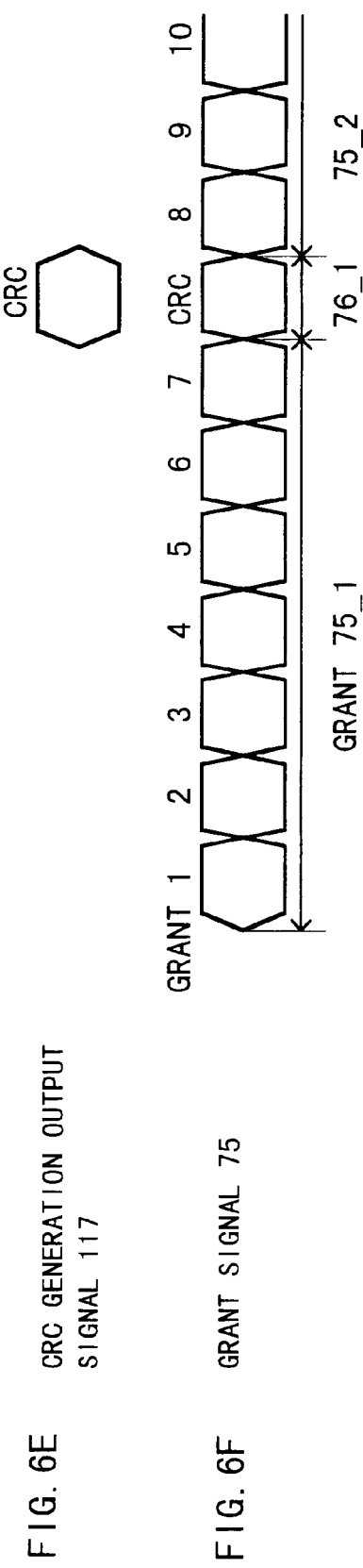
FIG. 6A  CLOCK 133
FIG. 6B  GRANT TIMING SIGNAL 114
FIG. 6C  CRC TIMING SIGNAL 123
FIG. 6D  GRANT GENERATION OUTPUT SIGNAL 116
FIG. 6E  CRC GENERATION OUTPUT SIGNAL 117
FIG. 6F  GRANT SIGNAL 75

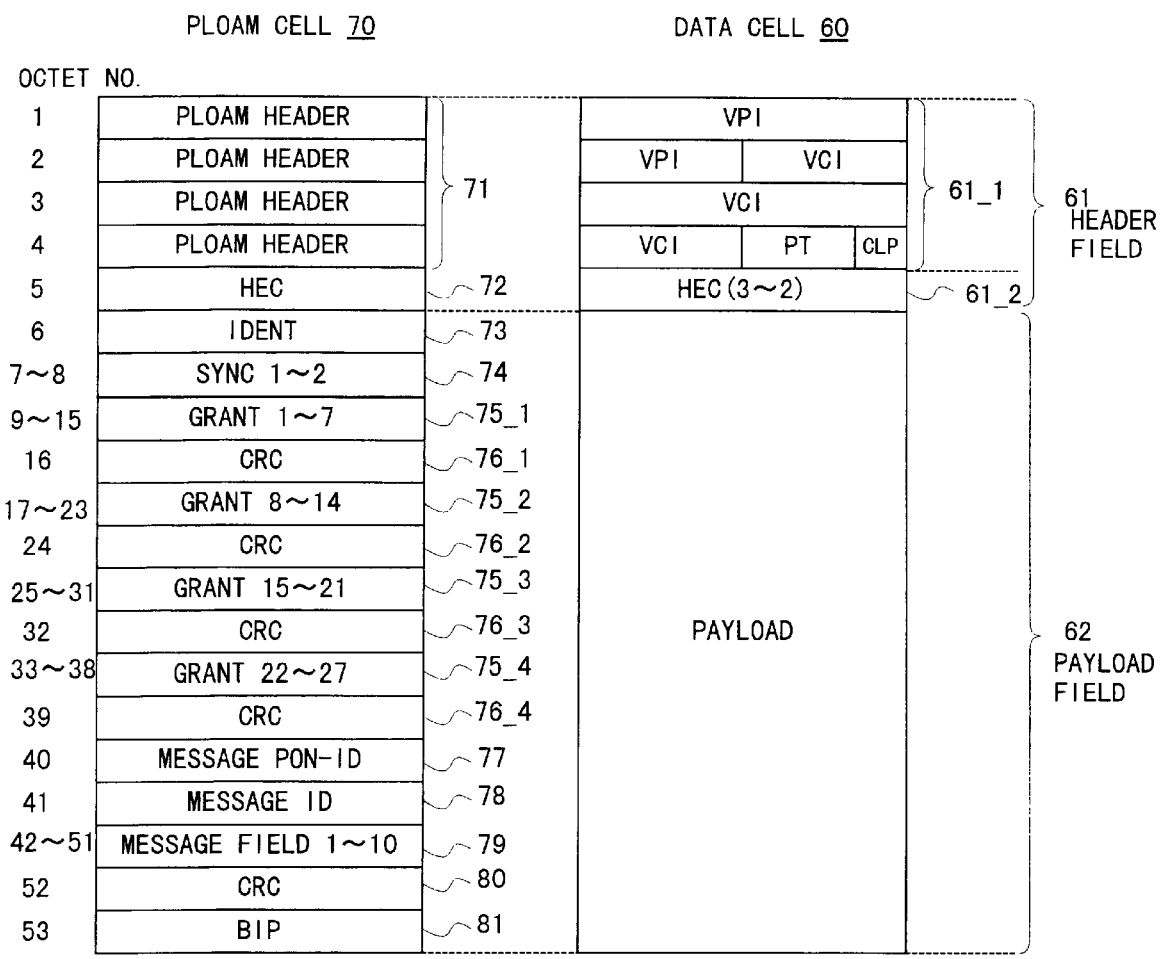

T FRAME 90 (150M MODE)

T FRAME 91 (600M MODE)

HOMO-CODE CONTINUITY PROOF TESTING DEVICE

BACKGROUND OF THE INVENTION

1. Field of the Invention

The present invention relates to a homo-code (identical or same code) continuity proof testing device, and in particular to a homo-code continuity proof testing device which conducts tests with test data including a predetermined homo-code continuity proof test pattern.

In recent years, a digital network has become rapidly widespread with the advance of an LSI technique, an optical fiber cable technique, a digital signal processing technique, and the like. For transferring a signal from a transmitting device to a receiving device in an asynchronous state in the digital network, there is a method wherein the receiving device extracts a clock included in a received signal to perform the receiving operation for the signal in synchronization with the extracted clock.

When the received signal includes a continuous or sequential homo-code in this method, it is difficult for the receiving device to extract the clock. As a measure for this difficulty, the transmitting device scrambles and transmits the signal so as not to include the continuous homo-code, while the receiving device extracts the clock from the received signal and then descrambles the received signal to restore the signal before the scrambling.

However, there is a possibility that the continuous homo-code is included even in the scrambled signal. Therefore, it is important how many bits continued with a homo-code at maximum would enable the receiving device to accurately extract the clock from the signal, that is whether or not the receiving device has a homo-code continuity proof strength.

2. Description of the Related Art

FIG. 16 shows an arrangement of a prior art homo-code continuity proof testing device 10. A device 40 to be tested is connected to the testing device 10 with a transmission line 30 which transmits a signal 100. In this arrangement, the transmission line 30 is an optical fiber, and the signal 100 is included in a frame, a packet, a cell, or the like and transmitted through the transmission line 30.

The testing device 10 is composed of a homo-code continuity pattern inserter 19 which inserts data 105 for generating a homo-code continuity proof test pattern on the transmission line 30, a frame head timing generator 29! which generates a frame head timing signal 107 indicating a frame head, a scrambler 16 which scrambles the data 105 from the inserter 19 to generate frame data 106 including a frame head pattern and the homo-code continuity proof test pattern by the timing signal 107, and an E/O converter 17 which synchronizes (multiplexes) the data 106 with a clock 101 and converts the electrical signal into the optical signal 100 to be transmitted to the transmission line 30.

The tested device 40 is composed of an O/E converter 41 for outputting data 201 which is the optical signal 100 from the transmission line 30 converted into the electrical signal and for extracting a clock 200 from the signal 100, a clock disconnection detector 50 for detecting whether or not the extracted clock 200 is disconnected to output a determination result signal 216, a frame head detector 51 for detecting the head of the frame data 201 to output a frame head timing signal 219, and a descrambler 42 for descrambling the data 201 to be restored, by the timing of the timing signal 219 being made a starting phase.

As mentioned above, when the homo-code either "0" or "1" continues in the data 100 on the transmission line 30, the clock components in the data 100 disappear, so that the clock 200 can not be extracted from the tested device 40. Therefore, the homo-code continuity proof test is performed in order to determine the limit of the homo-code continuity proof strength of the tested device 40 on the receiving side.

Namely, it is tested how many bits continued with the homo-code on the transmission line 30 would disable a clock extractor (not shown) of the O/E converter 41 to extract the clock, and disable the data to be normally received. The maximum bit number at which the clock can be extracted is supposed to be the homo-code continuity proof strength of the tested device 40.

The operations of the prior art homo-code continuity proof testing device 10 and the tested device 40 will now be described.

The testing device 10 predicts a scramble pattern at the homo-code continuity pattern inserter 19 in order to generate the homo-code continuity proof test pattern on the transmission line 30, and inserts thereinto such a pattern as the output of the scrambler 16 becomes all "0" or all "1" of a predetermined bit number.

Namely, the scrambler 16 is composed of a shift register and an EXOR circuit (not shown), and a self-reset type of scrambler for resetting a frame to all "1" at the frame head and performing the scrambling per each frame. Accordingly, the scramble pattern of the scrambler 16 can be predicted based on the same generation polynomial, the same starting phase, and the same initial value as the scrambler 16.

In order to transmit the homo-code of all "0" to the transmission line 30, the inserter 19 has only to generate the same pattern as the one at the scrambling time, and has only to provide the scrambler 16 with the pattern data 105 generated by the same generation polynomial, starting phase, and initial value as the scrambler 16.

Similarly, in order to transmit the homo-code of all "1" to the transmission line 30, the inserter 19 has only to provide the scrambler 16 with the inverted pattern data 105 of the scramble pattern.

It is to be noted that a frame head detecting pattern is mapped at the head of the frame, so that the scrambler 16 detects the head position by the timing signal 107 and scrambles all of the bits except the frame head detecting pattern.

The reason why the frame head detecting pattern is excluded from the scramble object is that the tested device 40 establishes a frame synchronization by this pattern.

The E/O converter 17 synchronizes (multiplexes) the data 106 with the clock 101, and converts the data 106 from the electrical signal into the optical signal 100 to be outputted to the transmission line 30.

In the tested device 40, the O/E converter 41 converts the received optical signal 100 into the electrical signal to extract the data 201 and the clock 200. The clock disconnection detector 50 determines the result of the homo-code continuity proof test by monitoring the clock disconnection. That the clock has been normally extracted means that the device has a strength for the homo-code continuity proof test pattern, while that the clock disconnection has been detected means that the device does not have a strength for the homo-code continuity proof test pattern.

In addition, the frame head detector 51 detects the frame head by the frame head detecting pattern, and the descrambler 42 restores the receiving data by starting the descrambling from the bit next to the frame head detecting pattern.

Thus, the prior art homo-code continuity proof testing device has determined the homo-code continuity proof strength by detecting the clock disconnection.

In such a determination method by the prior art homo-code continuity proof test, the determination reference is vague to what degree of disturbance of the extracted clock 200 the clock disconnection detector 50 can determine the clock disconnection, so that the disturbance of the extracted clock 200 influences the determination result. Therefore, there is a problem that the homo-code continuity proof strength can not be determined with a high accuracy.

On the other hand, the homo-code continuity proof testing device of the ATM-PON (Asynchronous Transfer Mode Passive Optical Network) system conformed to the ITU-T recommendation G.983 has also a problem, which will now be described.

The technique of the ATM-PON system is indispensable for the construction of such an optical access network as represented by the FTTH (Fiber to the Home) in order to achieve an advanced information communication service.

The above-noted recommendation prescribes the communication protocol between an Optical Network Unit (hereinafter abbreviated as ONU) providing a general subscriber with an interface and an Optical Line Termination (hereinafter abbreviated as OLT) on the station side.

FIGS. 17A and 17B respectively show a format of a down PLOAM cell 70 and an ATM data cell 60 in the ATM-PON.

The PLOAM cell 70 is composed of a PLOAM HEADER field 71 of octet Nos. "1"–"4" and an HEC field 72 of an octet No."5" for detecting the synchronization of the PLOAM cell, an IDENT field 73 of an octet No."6" for detecting the frame synchronization, an SYNC field 74 of octet Nos."7" and "8" for offering 1 KHz reference, GRANT fields 75_1–75_4 of octet Nos."9"–"15", "17"–"23", "25"–"31", and "33"–"38" for prescribing the up bandwidth of the ONU, CRC fields 76_1–76_4 of octet Nos."16", "24", "32", and "39" for protecting grant information, a message PON-ID field 77 of an octet No."40", a message ID field 78 of an octet No."41", a message field 79 of octet Nos."42"–"51", a CRC field 80 of an octet No."52" for protecting a message, and a BIP field 81 of an octet No."53".

The ATM data cell 60 is composed of a header field 61 of the octet Nos."1"–"5", and a payload field 62 of the octet Nos."5"–"53". The header field 61 is composed of a field 61_1 for VPI, VCI, PTI, and CLP, and an HEC field 61_2.

Hereinafter, reference numerals of the data and the signals set in the fields of the PLOAM cell 70 and the ATM data cell 60 are occasionally used for those of the fields, for the convenience's sake.

FIGS. 18A and 18B respectively show an arrangement of down T frames of 155 Mbps and 600 Mbps. The 155 Mbps down frame shown in FIG. 18A is composed of 56 cells, i.e. a PLOAM cell 70_1, ATM data cells 60_1–60_27, a PLOAM cell 70_2, and ATM data cells 60_28–60_54.

The 600 Mbps down frame shown in FIG. 18B is composed of 224 cells, i.e. the PLOAM cell 70_1, the ATM data cells 60_1–60_27, the PLOAM cell 70_2, and the ATM data cells 60_28–60_54, as well as a PLOAM cell 70_8 and ATM data cells 60_190–60_216.

While the generation of the ATM-PON homo-code continuity proof test pattern is prescribed by the ITU-T recommendation G.983, its generation means and detection method are not prescribed.

The homo-code continuity proof test pattern of the ATM-PON prescribed by the recommendation is composed of the following four types of blocks whose data are continuous.
① All "1"
② PN (pseudo random) pattern whose mark rate is ½ (hereinafter, occasionally referred to as PN signal)
③ All "0"
④ Data block composed of ATM header The arrangement of the test pattern is prescribed as the repetition of the ATM cell formed by the above types ④, ①, and ② and the ATM cell formed by the above types ④, ③, and ②.

This test pattern is more complicated compared with the prior art homo-code continuity proof test pattern of all "0" or all "1".

Moreover, as for the down T frame in that recommendation, a distributed (not resetting periodically) type of scrambling whose starting phase is free and which performs the scrambling sequentially is prescribed, and requires the scrambling for all of the bits of the down frame.

Namely, different from the prior art reset type of scrambling method in which the scrambling starting phase and the then initial value are predetermined periodically, the value of the shift register is not specified in the scrambler circuit at the phase where the homo-code continuity proof test pattern is desired to be generated, and the execution of the homo-code continuity proof test by the scrambling requires a complicated circuit.

SUMMARY OF THE INVENTION

It is accordingly an object of the present invention to provide a homo-code continuity proof testing device for performing tests by using test data including a predetermined homo-code continuity proof test pattern wherein the device performs a homo-code continuity proof test with a definite determination reference and a high determination accuracy without a complicated circuit.

In order to achieve the above-mentioned object, a homo-code continuity proof testing device of the present invention according to claim 1 comprises a synchronous pattern inserter which inserts a data synchronous pattern into test data, a test pattern inserter which inserts a predetermined test pattern, for testing a homo-code continuity proof strength, into the test data, a synchronizing portion which synchronizes the test data, with a predetermined clock, to be transmitted, and an error detecting pattern adder which adds an error detecting pattern for detecting an error to the test data.

Namely, as shown in FIG. 1, a data synchronous pattern inserter 19 in a homo-code continuity proof testing device (OLT) 10 on a transmitting side inserts a data synchronous pattern into test data (ATM data cell) 60, enabling a homo-code continuity proof testing device (ONU) 40 on a receiving side to establish the synchronization of the test data.

A test pattern inserter (homo-code continuity pattern inserter) 18 inserts a predetermined test pattern into test data (cell 103), so that an E/O converter 17 which comprises a synchronizing portion synchronizes test data (cell 106), with a predetermined clock 101, to be transmitted as e.g. a down cell 100 to a transmission line 30.

Also, the error detecting pattern adder of the testing device 10 on the transmitting side adds an error detecting pattern for detecting the test data error. The error detecting pattern enables the testing device 40 on the receiving side to make a determination for the homo-code continuity proof test.

In order to achieve the above-mentioned object, a homo-code continuity proof testing device of the present invention according to claim 2 comprises a clock extractor which receives test data including a predetermined test pattern for testing a data synchronous pattern and a homo-code continuity proof strength to extract a clock included in the test data, a data synchronization detector which detects the data synchronous pattern in synchronization with the clock, and a homo-code continuity proof test determining portion which determines a homo-code continuity proof test based on a detection result of the data synchronous pattern.

Namely, in FIG. 1, the clock extractor included in the O/E converter 41 of the homo-code continuity proof testing device (ONU) 40 extracts a clock 200 included in the test data. A data synchronization detector 43 detects the data synchronous pattern included in e.g. a cell 201 (test data) in synchronization with the clock 200. When not detecting the synchronous pattern from the cell 201, the homo-code continuity proof test determining portion 48 included in e.g. the synchronization detector 43 outputs a synchronization determination result signal 218 indicating said fact. Otherwise the homo-code continuity proof test determining portion 48 outputs the synchronization determination result signal 218 indicating the opposite fact.

Based on this determination result signal 218, it is determined whether or not the. ONU 40 has a homo-code continuity proof strength for the test pattern.

Namely, upon occurrence of a clock disconnection or a clock disturbance, the clock 200 can not be normally extracted from the down cell 100, resulting in the miss of synchronization. Accordingly, the synchronization determination result of the ONU 40 can be regarded as that of the homo-code continuity proof test without changes as follows:

Established synchronization of ONU 40→normal homo-code continuity proof test determination (having a proof strength)

Missed synchronization of ONU 40→abnormal homo-code continuity proof test determination (having no proof strength)

Thus, the homo-code continuity proof test can be performed with a definite and highly accurate determination reference of "presence/absence of established synchronization" without a complicated circuit, not by directly monitoring the clock disconnection and the clock disturbance but by monitoring the miss of synchronization in the down cell.

Also, in the present invention of claim 3 according to the present invention of claim 2, the test data may include an error detecting pattern for detecting an error, the device may further comprise an error calculator which calculates a presence/absence of an error of the test data in synchronization with the clock, the test determining portion may determine the homo-code continuity proof test based on a calculating result of the error calculator.

Namely, the error detecting pattern is included in the test data 201. An error calculator 45 calculates the presence/absence of the test data error based on the error detecting pattern in synchronization with the extracted clock 200. In the absence of an error, the test determining portion 48 determines that there is a homo-code continuity proof strength, but otherwise it determines that there is not a homo-code continuity proof strength.

Namely, when the clock 200 can not be extracted, the synchronization for detecting the test data can not be guaranteed, so that the test data error is detected. Thus, it becomes possible to regard the extracted error of the clock 200 as the error detection of the test data.

Also, in the present invention of claim 4 according to the present invention of claim 2, a plurality of test data may compose a frame including a frame synchronous pattern, the device may further comprise a frame synchronization detector which detects the frame synchronous pattern in synchronization with the clock, the test determining portion may determine the homo-code continuity proof test based on the detection result of the frame synchronous pattern.

Namely, the down data are composed of a frame including a frame synchronous pattern, so that a frame synchronous detector detects the frame synchronous pattern in synchronization with the extracted clock 200. In the same way as the data synchronous pattern of claim 1, the test determining portion can determine the result of the homo-code continuity proof test depending on the detection/undetection of the frame synchronous pattern.

Also, as for the present invention according to claim 5, a homo-code continuity proof testing device may comprise a scrambler which scrambles transmitting data, a synchronous pattern inserter which inserts a data synchronous pattern into the transmitting data, a test pattern inserter which inserts a predetermined test pattern for testing a homo-code continuity proof strength into the transmitting data, and a synchronizing portion which synchronizes the transmission data, with a predetermined clock, to be transmitted, so that the scrambler may not scramble the test pattern.

Namely, when the test data are usual, the scrambler scrambles the data to be transmitted, while when the test data include the test pattern, the scrambler transmits the data without scrambling.

Thus, the test pattern inserter 18 is not required to consider the scrambling characteristic of the scrambler, and has only to insert the predetermined test pattern without any change into the test data, resulting in a simple circuit arrangement.

Also, in the present invention of claim 6 according to the present invention of claim 2, the device may further include a descrambler which descrambles the test data but may not descramble the test pattern upon testing.

Namely, the descrambler does not descramble the test data when it is indicated that the test is being performed.

Thus, the test data including the test pattern, not scrambled, sent from the testing device 10 on the transmitting side can be received.

Also, in the present invention of claim 7 according to the present invention of claim 2, the data synchronous pattern may comprise an HEC of at least one of a data cell and a PLOAM cell.

Also, in the present invention of claim 8 according to the present invention of claim 2, the data synchronous pattern may comprise a PLOAM header of a PLOAM cell.

Also, in the present invention of claim 9 according to the present invention of claim 1, the error detecting pattern may comprise a BIP.

Also, in the present invention of claim 10 according to the present invention of claim 3, the error detecting pattern may comprise a BIP.

Also, in the present invention of claim 11 according to the present invention of claim 4, the frame synchronous pattern may comprise an IDENT of a PLOAM cell.

Also, in the present invention of claim 12 according to the present invention of claim 4, the frame synchronous pattern may comprise an IDENT of a PLOAM cell.

Also, in the present invention of claim 13 according to the present invention of claim 1, the test pattern may be inserted into a grant field of a PLOAM cell.

Also, in the present invention of claim 14 according to the present invention of claim 2, the test pattern may be inserted into a grant field of a PLOAM cell.

Also, in the present invention of claim 15 according to the present invention of claim 1, the error detecting pattern may comprise a CRC of a grant.

Also, in the present invention of claim 16 according to the present invention of claim 3, the error detecting pattern may comprise a CRC of a grant.

Also, in the present invention of claim 17 according to the present invention of claim 1, the test pattern may be inserted into a message field of a PLOAM cell.

Also, in the present invention of claim 18 according to the present invention of claim 2, the test pattern may be inserted into a message field of a PLOAM cell.

Also, in the present invention of claim 19 according to the present invention of claim 1, the error detecting pattern may comprise a CRC of a message.

Also, in the present invention of claim 20 according to the present invention of claim 3, the error detecting pattern may comprise a CRC of a message field.

Also, in the present invention of claim 21 according to the present invention of claim 2, the test pattern may be conformed to the ITU-T recommendation G.983.

Also, in the present invention of claim 22 according to the present invention of claim 17 or 18, a vendor message may be inserted into the message field.

BRIEF DESCRIPTION OF THE DRAWINGS

FIGS. 6A–6F are time charts showing operation examples of a grant generator in a homo-code continuity proof testing device according to the present invention;

FIGS. 17A and 17B are format diagrams showing an arrangement of a general cell.

Throughout the figures, like reference numerals indicate like or corresponding components.

DESCRIPTION OF THE EMBODIMENTS

Figure 1:
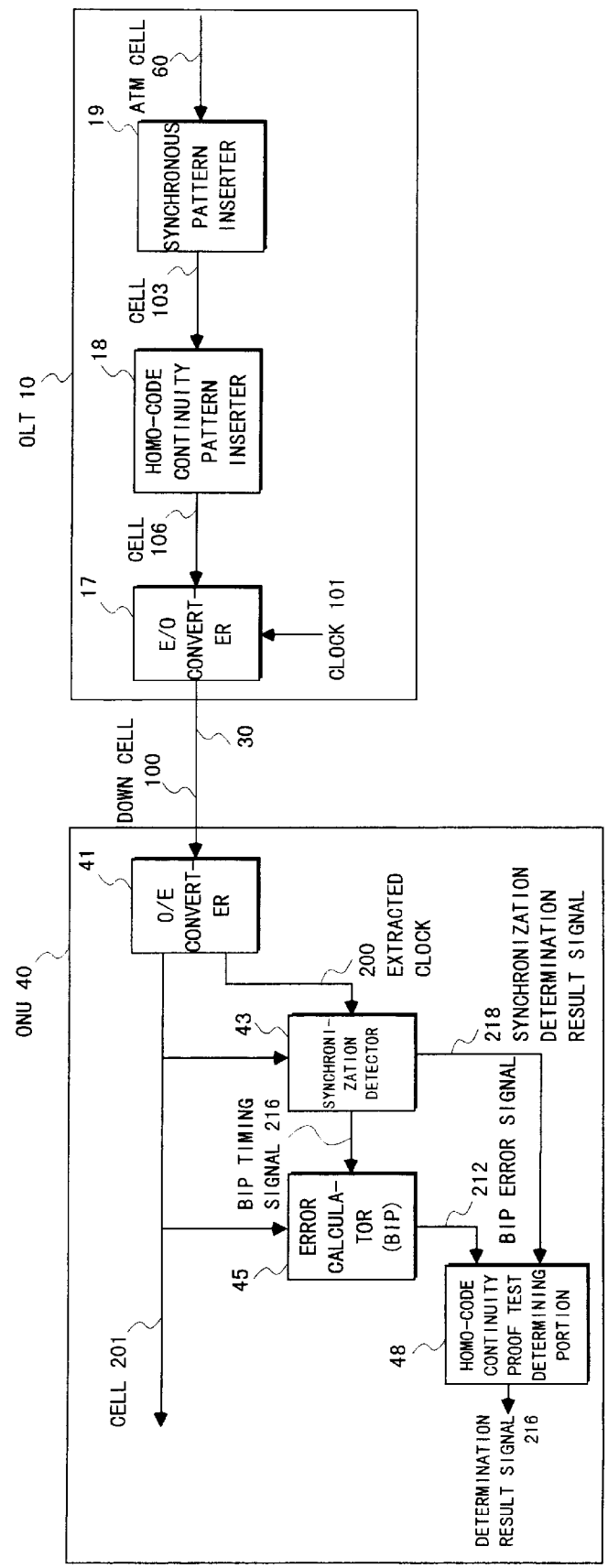
FIG. 1 is a block diagram showing a principle of a homo-code continuity of testing device according to the present invention.
Figure 2:
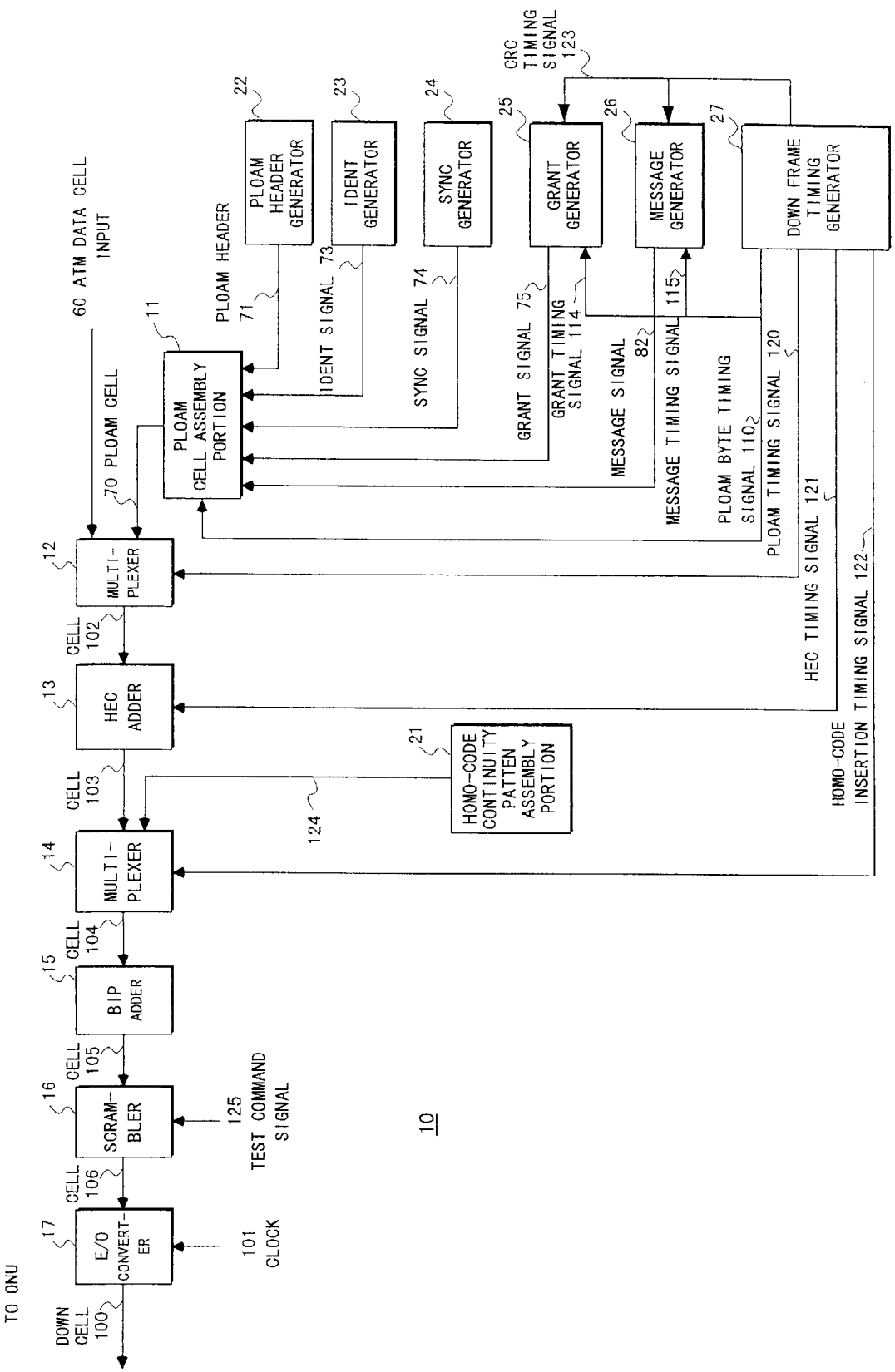
FIG. 2 is a block diagram showing an embodiment of an OLT composing a homo-code continuity proof testing device according to the present invention.

FIG. 2 shows an embodiment of the OLT 10 composing a homo-code continuity proof testing device according to the present invention. This OLT 10 includes a multiplexer 12 for outputting a cell or frame 102 (hereinafter, occasionally and simply referred to as cell) which is the ATM data cell 60 multiplexed with the PLOAM cell 70, an HEC adder 13 for outputting the cell 103 which is the cell 102 to which the HEC's $61\_2$ and 72 (see FIGS. 17A and 17B) are added, a multiplexer 14 for outputting, to the cell 103, a cell 104 into which a homo-code continuity proof test pattern signal 124 is inserted with a timing of a homo-code inserting timing signal 122, a BIP adder 15 for outputting a cell 105 to which the BIP calculation of the cell 104 is performed and the BIP 81 (see FIG. 17A) is added, a scrambler 16 for outputting a cell 106 which performs a distributed type of scramble to all bits of the whole cell 105, and the E/O converter 17 for synchronizing (multiplexing) the cell 106 with the clock 101 and for converting the electrical signal into the down cell (frame) 100 of the optical signal.

The testing device 10 further includes a PLOAM header generator 22 for generating the PLOAM header 71, an IDENT generator 23 for generating the IDENT signal 73 of the PLOAM cell, an SYNC generator 24 for generating the SYNC signal 74 of the PLOAM cell, a grant generator 25 for generating the grant signal 75 by inputting timing signals 114 and 123, a message generator 26 for generating a message signal 82 by inputting timing signals 115 and 123, a down frame timing generator 27 for generating timing signals 110, 114, 115, 120, 121, 122, and 123 to generate the down frame, a PLOAM cell assembly portion 11 for assembling the PLOAM cell 70, and a homo-code continuity pattern assembly portion 21 and to assemble the test pattern signal 124 by inputting the PLOAM header 71, the IDENT signal 73, the SYNC signal 74, the grant signal 75, the message signal 82, the timing signal 110.

Figure 3:
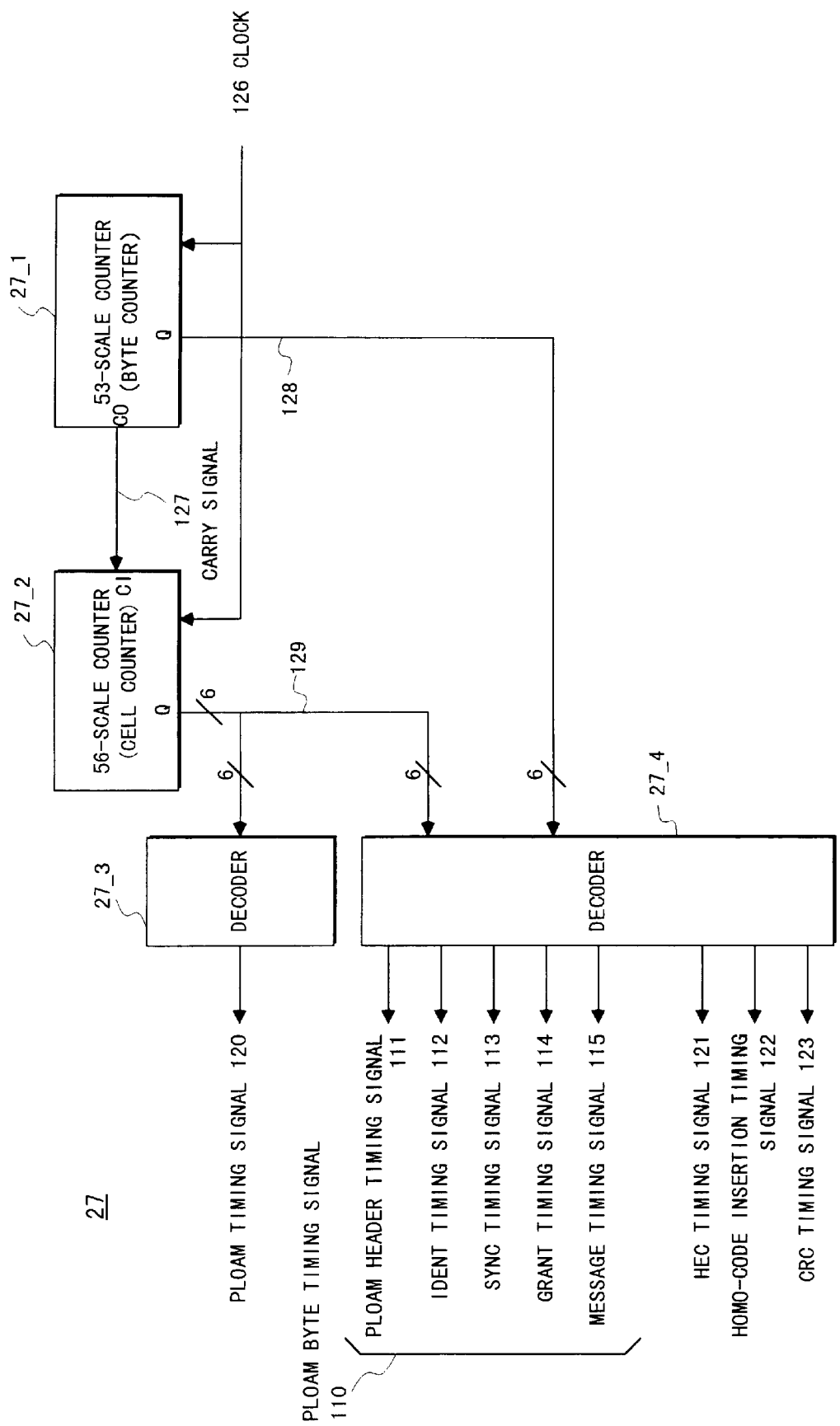
FIG. 3 is a block diagram showing an embodiment of a down frame timing generator in a homo-code continuity proof testing device according to the present invention.

FIG. 3 shows an embodiment of the down frame timing generator 27 shown in FIG. 2. This generator 27 includes a 53-scale counter $27\_1$ for inputting a clock 126 to output a counter output signal 128 indicating an octet number for a single cell, and a 56-scale counter $27\_2$ for inputting the carry signal 127 of the 53-scale counter $27\_1$ and the clock 126 to output a counter output signal 129 indicating a cell number for a single frame.

Furthermore, the generator 27 is composed of a decoder $27\_3$ for decoding the output signal 129 to output the PLOAM timing signal 120 indicating the timing of the PLOAM cell in the frame, and a decoder 27_4 for inputting the output signals 128 and 129 to output the timing signal 110, and 121–123. It is to be noted that the timing signal 110 is a general term for the timing signals 111–115, and includes the timing signals 111–115.

Figure 4:
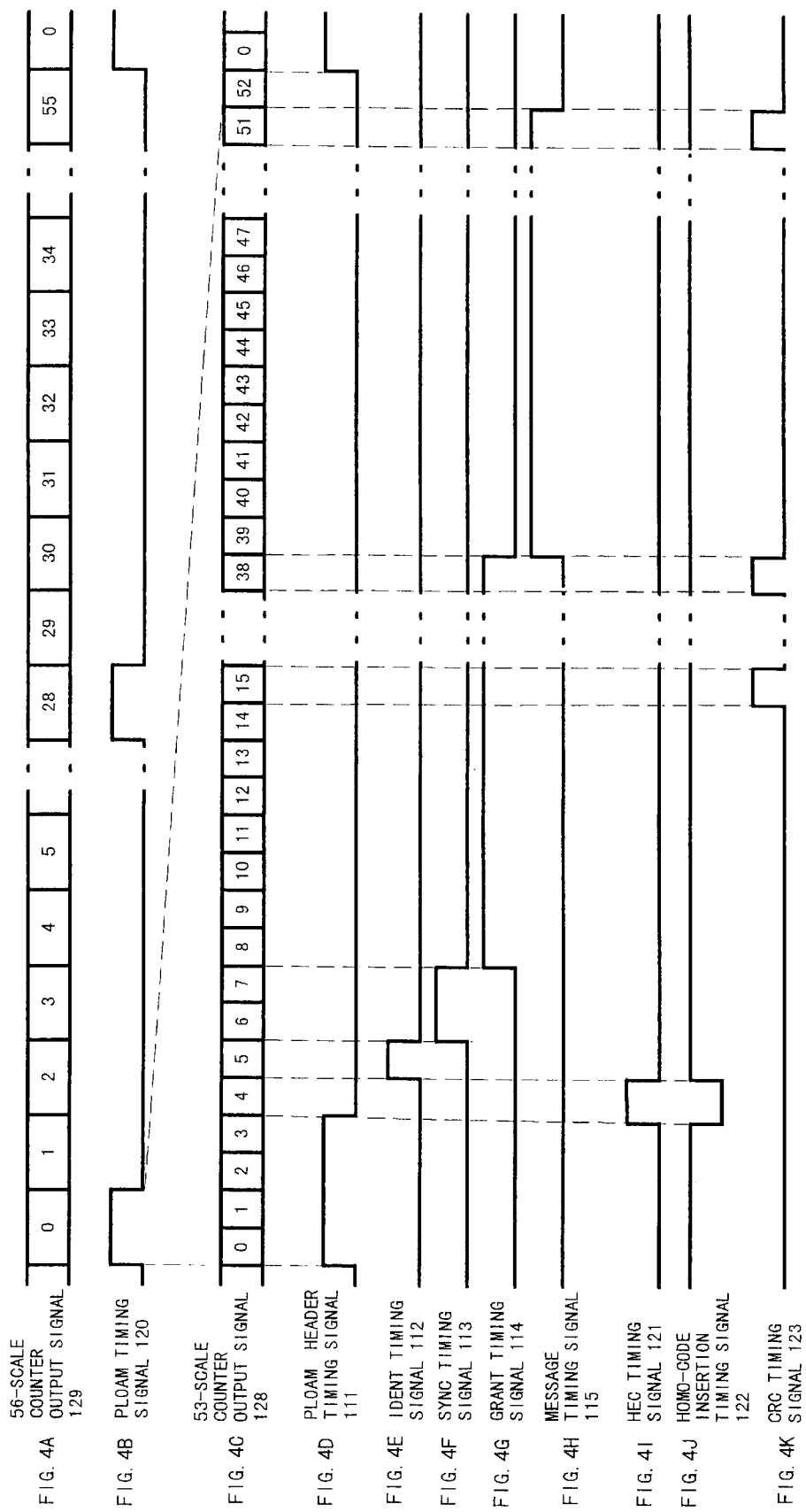
FIGS. 4A–4K are time charts showing an operation example of a down frame timing generator in a homo-code continuity proof testing device according to the present invention.

FIGS. 4A–4K show operation timing examples of the down frame timing generator 27. FIG. 4C shows the output signal 128 of the 53-scale counter 27_1 which counts the clock 126 to repeatedly output "0"–"52 (decimal scale)".

FIG. 4A shows the output signal 129 of the 56-scale counter 27_2 which counts the carry signal 127 to repeatedly output "0"–"55 (decimal scale)".

FIG. 4B shows the PLOAM timing signal 120, and the decoder 27_3 outputs the timing signal 120="1" when the output signal 129 is "0" or "28 (decimal scale)".

FIGS. 4D–4I, and 4K respectively show the timing signals 111, 112, 113, 114, 115, 121, and 123, which respectively show the timings when the followings are inserted, i.e. the PLOAM header 71 of 4 octets, the IDENT signal 73 of a single octet, the SYNC signal 74 of 2 octets, the grant signals 75_1–75_4 of 7 octets respectively+CRC's 76_1–76_4 of a single octet respectively, the messages (message PON-ID 77, message ID 78, and message field 79+CRC's 76_1–76_4), and the CRC's 76_1–76_4, and 80 shown in FIG. 17A.

FIG. 4J shows the homo-code insertion timing signal 122. When this signal 122 is "1", the homo-code continuity proof test pattern is inserted.

It is to be noted that FIGS. 4A–4K do not show the timing signal by which the ATM data cell 60 is inserted, while this timing signal can be generated in the same way as the timing signal of the PLOAM cell.

Also, the timing signal 122 shows the case where only an HEC synchronization is determined, and the test pattern can be compulsorily inserted by this timing (timing except HEC).

Figure 5:
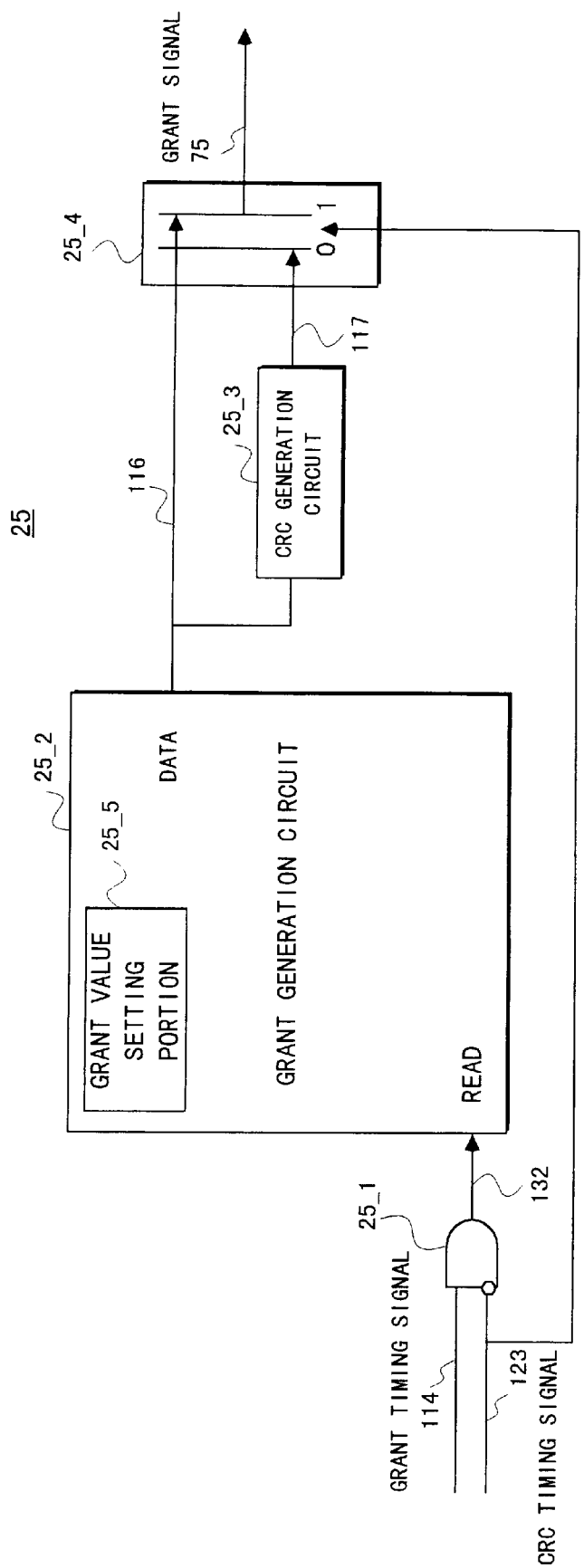
FIG. 5 is a block diagram showing an embodiment of a grant generator in a homo-code continuity proof testing device according to the present invention.

FIG. 5 shows an embodiment of the grant generator 25 shown in FIG. 2.

This generator 25 is composed of a gate circuit 25_1 which inputs the grant timing signal 114 and the CRC timing signal 123 to output a read signal 132, a grant generation circuit 25_2 which inputs the read signal 132 and a clock 133 (not shown) to output a grant generation output signal 116, a CRC generation circuit 25_3 which inputs the output signal 116 and the clock 133 to output a CRC generation output signal 117, and a selection circuit 25_4 which selects the output signals 116 and 117 by the timing signal 123 to output the grant signal 75.

In addition, the grant generation circuit 25_2 builds in a grant value setting portion 25_5.

FIGS. 6A–6F show operation timing examples of the generator 25 shown in FIG. 5.

FIG. 6A shows the synchronizing clock 133 of the generator 25, and FIGS. 6B and 6C respectively show the grant timing signal 114 (grant+CRC timing) and the CRC timing signal 123 shown in FIGS. 4G and 4K.

The grant generation circuit 25_2 generates the grant generation output signal 116 according to the setting of the grant value setting portion 25_5 by the timing of the timing signal 114="1" and the timing signal 123="0". The CRC generation circuit 25_3 performs the CRC calculation of the generated output signal 116 to generate the CRC generation output signal 117. The selection circuit 25_4 selects the output signal 116 by the timing of the timing signal 123="0", and selects the output signal 117 by the timing of the timing signal 123="1" to output the grant signal 75.

When the homo-code continuity proof test is performed by using the grant field, the test pattern which guarantees the CRC can be obtained by equalizing the grant value set in the grant value setting portion 25_2 with the homo-code continuity proof test pattern.

As for the message field at this time, the output from the message generator 26, described later, may be used as it is.

Figure 7:
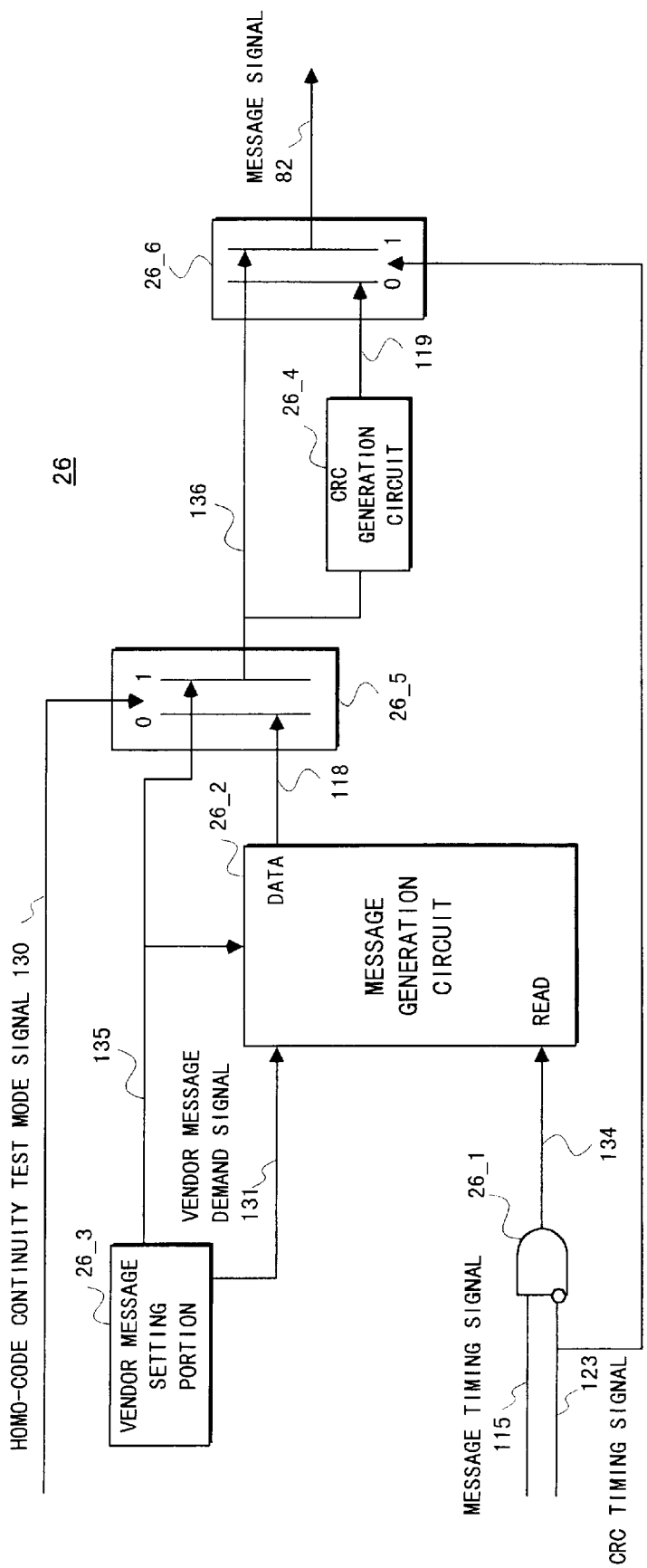
FIG. 7 is a block diagram showing an embodiment of a message generator in a homo-code continuity proof testing device according to the present invention.

FIG. 7 shows an embodiment of the message generator 26. This generator 26 is composed of a gate circuit 26_1 for inputting the timing signals 115 and 123 to output a read signal 134, a vendor message setting portion 26_3 for outputting a vendor message signal 135 and a demand signal 131, a message generator 26_2 for generating a message generation output signal 118 by inputting the signals 131, 134, and 135, a selection circuit 26_5 for outputting a signal 136 which selects one of the signals 118 and 135 by a homo-code continuity test mode signal 130, a CRC generation circuit 26_4 for generating a CRC generation output signal 119 by performing the CRC calculation of the signal 136, and a selection circuit 26_6 for outputting the message signal 82 which selects one of the signals 136 and 119 by the timing signal 123.

FIGS. 8A–8H show operation timings of the message generator 26.

Figure 8:
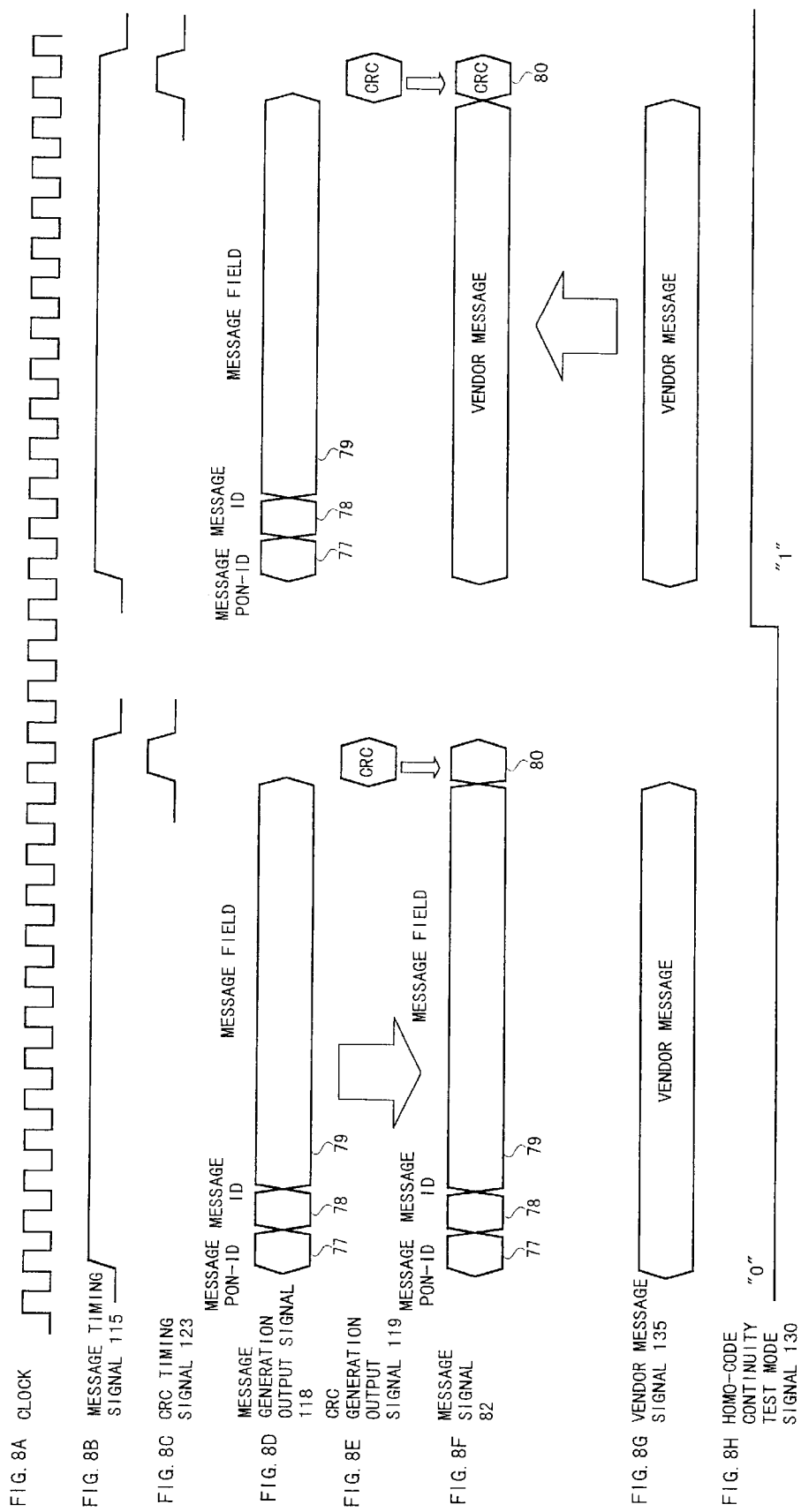
FIGS. 8A–8H are time charts showing operation examples of a message generator in a homo-code continuity proof testing device according to the present invention.

FIG. 8A shows synchronous clocks of the message generator 26. FIGS. 8B and 8C respectively show the timing signals 115 and 123 shown in FIGS. 4H and 4K.

FIG. 8D shows the output signal 118, in which the signals of the message PON-ID 77, the message ID 78, and the message field 79 are sequentially generated by the timings of the timing signal 115="1" and the timing signal="0". FIG. 8G shows the vendor message signal 135.

FIG. 8H shows the homo-code continuity test mode signal 130. FIG. 8E shows the CRC generation output signal 119. When the test mode signal 130 is "0", the CRC of the output signal 118 is generated.

When the test mode signal 130 is "1" the CRC of the vendor message signal 135 is generated.

FIG. 8F shows the message signal 82, in which the output signal 118 and its CRC are outputted when the test mode signal 130 is "0", and the vendor message signal 135 and its CRC are outputted when the test mode signal 130 is "1".

Namely, when the test mode signal 130 is "1", the vendor message whose contents can be set by the vendor is adopted to be outputted. Accordingly, by equalizing the content of the vendor message signal 135 with the homo-code continuity test pattern, the homo-code continuity proof test which guarantees the CRC can be performed.

This enables the homo-code continuity proof test to be performed with the CRC for the vendor message protection being guaranteed.

While in this example the test pattern is inserted into only the vendor message, the homo-code continuity proof test may be performed with the test pattern being inserted into the message generation circuit and the CRC for the message protection including the test pattern being guaranteed.

Figure 9:
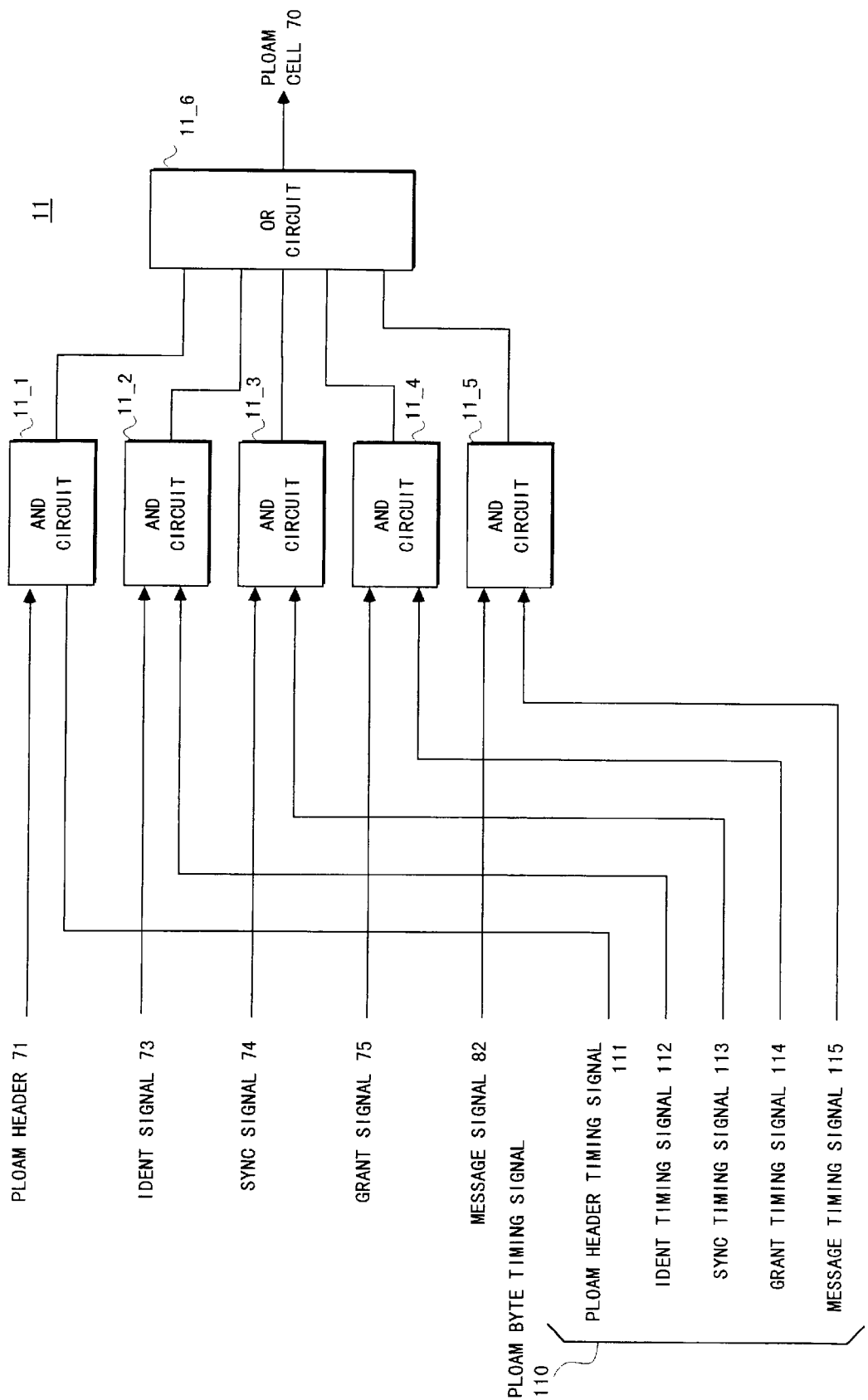
FIG. 9 is a block diagram showing an embodiment of a PLOAM cell assembly portion in a homo-code continuity proof testing device according to the present invention.

FIG. 9 shows an embodiment of the PLOAM cell assembly portion 11 shown in FIG. 2. This assembly portion 11 is composed of an AND circuit 11_1 for outputting the logical product of the PLOAM header 71 and the timing signal 111, an AND circuit 11_2 for outputting the logical product of the IDENT signal 73 and timing signal 112, an AND circuit 11_3 for outputting the logical product of the SYNC signal 74 and the timing signal 113, an AND circuit 11_4 for outputting the logical product of the grant signal 75 and the timing signal 114, an AND circuit 11_5 for outputting the logical product of the message signal 82 and the timing signal 115, and an OR circuit 11_6 for outputting the PLOAM cell 70 which is the logical sum of the output signals of the AND circuits 11_1–11_5.

Figure 10:
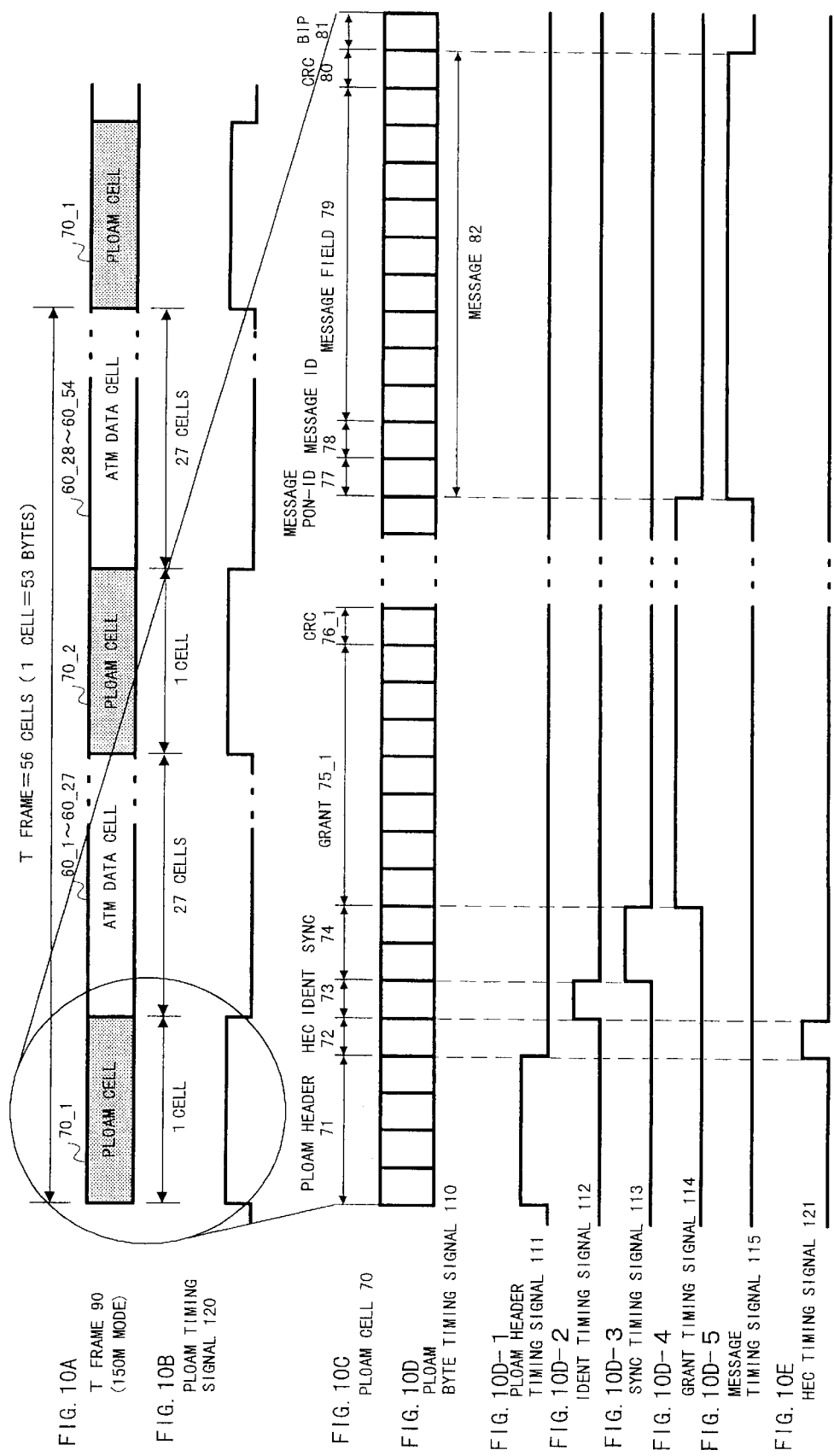
FIGS. 10A–10E are time charts showing operation examples of a PLOAM cell assembly portion in a homo-code continuity proof testing device according to the present invention.

FIGS. 10A–10E show operation timings of the assembly portion 11. FIG. 10A shows a format of the T frame 90 in the 150M mode of the above-mentioned FIG. 18A. FIGS. 10B, 10D-1, 10D-2, 10D-3, 10D-4, 10D-5, and 10E show the same signals as the timing signals 120, 111, 112, 113, 114, 115, and 121 respectively shown in FIGS. 4B, 4D, 4E, 4F, 4G, 4H, and 4I.

FIG. 10C shows the PLOAM cell 70, which is assembled with the PLOAM header 71, the IDENT 73, the SYNC 74, the grants 75_1–75_4, their CRC's 76_1–76_4, the message 82, and the HEC 72 respectively inserted by the timing of the timing signals 111–115 and 121, and the BIP 81 inserted by the timing after the insertion.

Figure 18A:
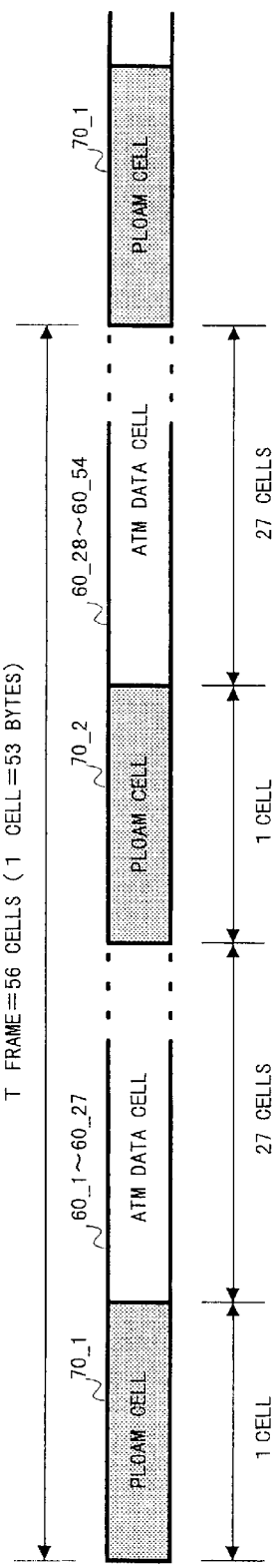
FIGS. 18A and 18B are format diagrams showing an arrangement of a general down frame.
Figure 18B:
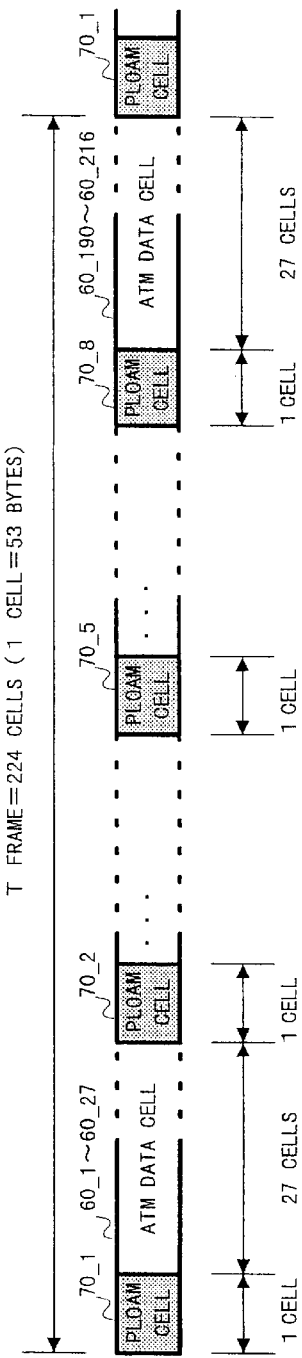

It is to be noted that the T frame 90 of the 150M mode in FIG. 10A may be the T frame 91 of the 600M mode shown in FIG. 18B. This applies to the T frame 90 of FIG. 13A and FIG. 15A described later.

Figure 11:
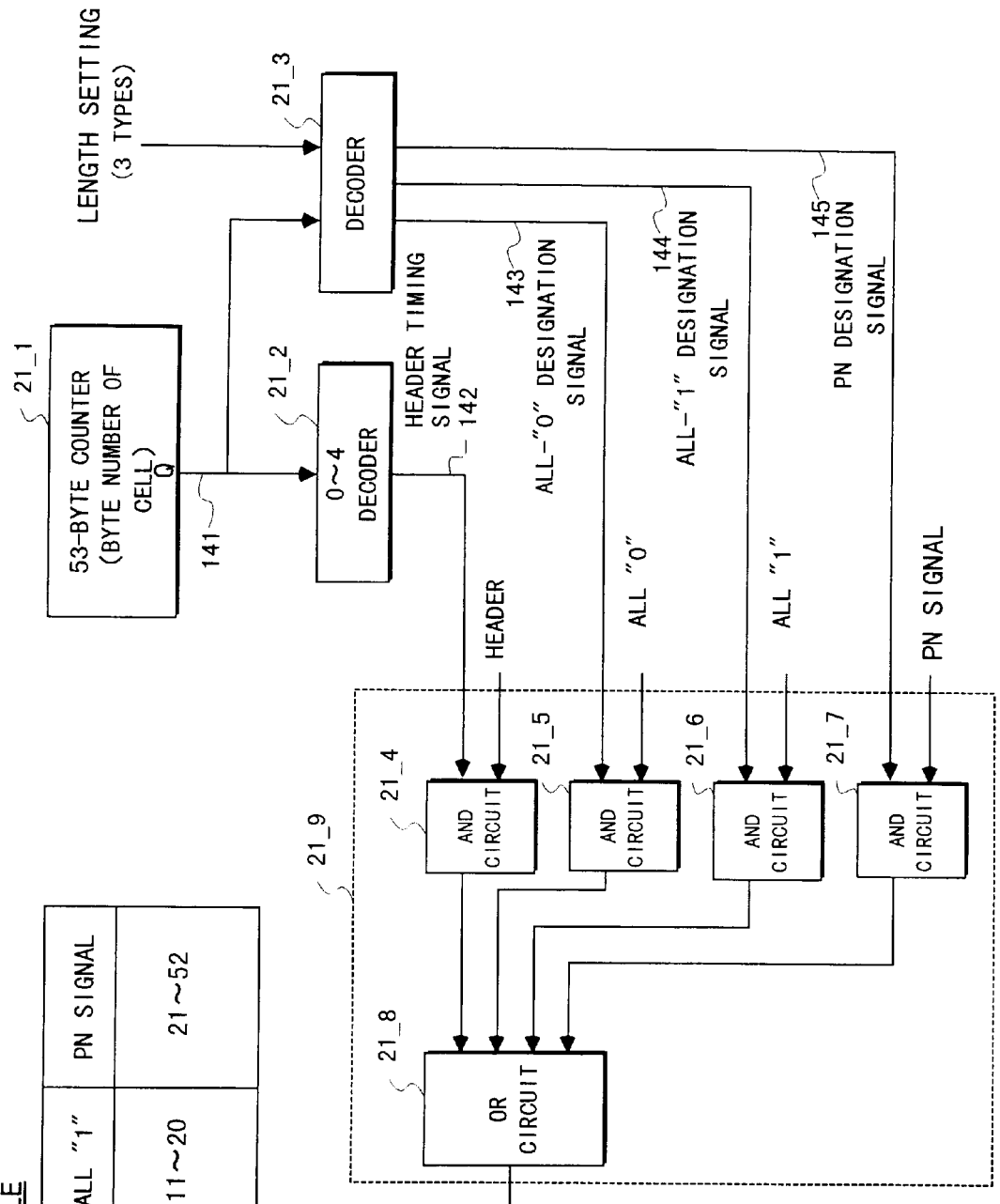
FIGS. 11A and 11B are block diagrams showing embodiments of a homo-code continuity pattern assembly portion in a homo-code continuity proof testing device according to the present invention.

FIGS. 11A and 11B show embodiments of the homo-code continuity proof test pattern assembly portion 21 shown in FIG. 2.

This assembly portion 21, as shown in FIG. 11B, is composed of a 53-byte counter 21_1, a decoder 21_2 for decoding the output signal 141 of the counter 21_1 to output a header timing signal 142, a decoder 21_3 for outputting an all-"0" designation signal 143, an all-"1" designation signal 144, a PN designation signal 145 in accordance with the output signal 141 and a length setting example shown in FIG. 11A, and a selector 21_9 consisting of AND circuits 21_4–21_7 and an OR circuit 21_8 for outputting the homo-code continuity proof test pattern signal 124 which selects the header, the all-"0" signal, the all-"1" signal, and the PN signals respectively by the timings of the signals 142–145.

Figure 12:
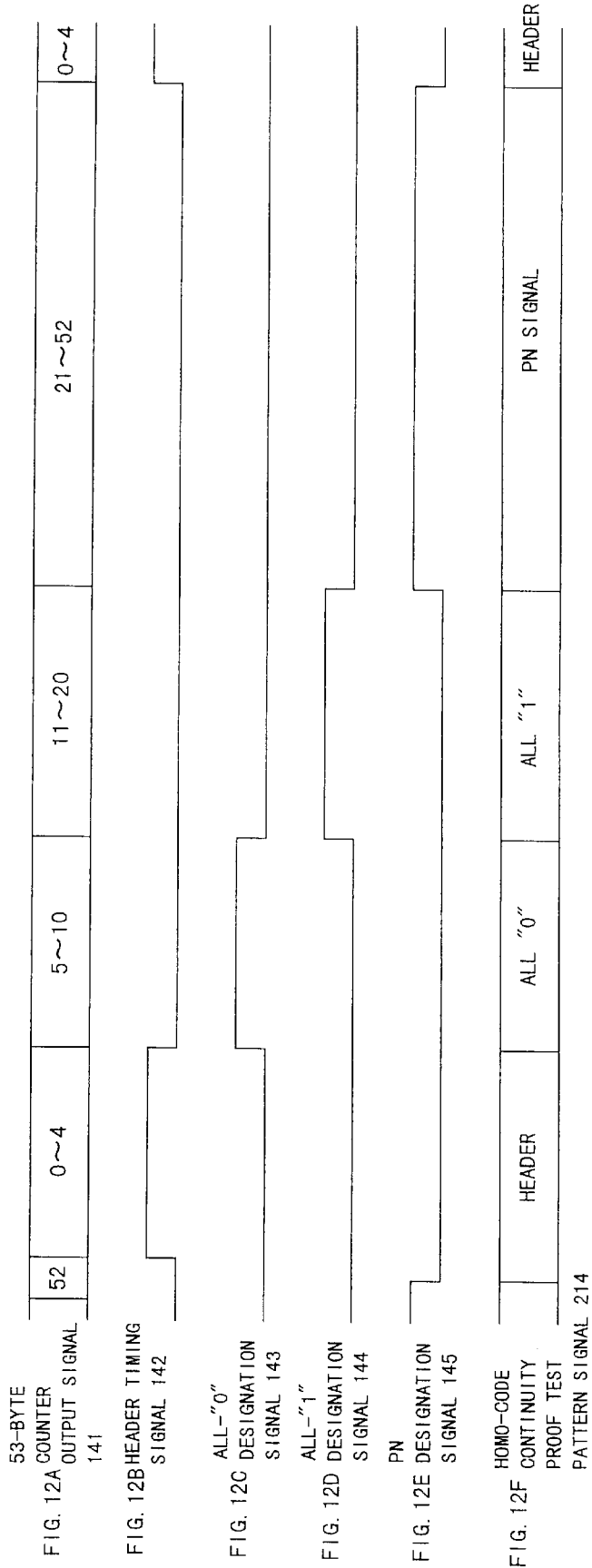
FIGS. 12A–12F are time charts showing operation examples of a homo-code continuity pattern assembly portion in a homo-code continuity proof testing device according to the present invention.

FIGS. 12A–12F show operation timings of the assembly portion 21. ABSTRACT FIG. 12A shows the output signal 141 of the 53-byte counter 21_1, and FIGS. 12B–12E respectively show the signals 142–145. The header, the all-"0" signal, the all-"1" signal, and the PN signals are sequentially inserted into the test pattern signal 124 of FIG. 12F by the timings of the output signal 141="0"–"4", "5"–"10", "11"–"20", and "21"–"52".

It is to be noted that when the length setting of FIG. 11A is set based on the recommendation G.983 either the all-"0" or all-"1" signal is inserted into a single cell.

Figure 13:
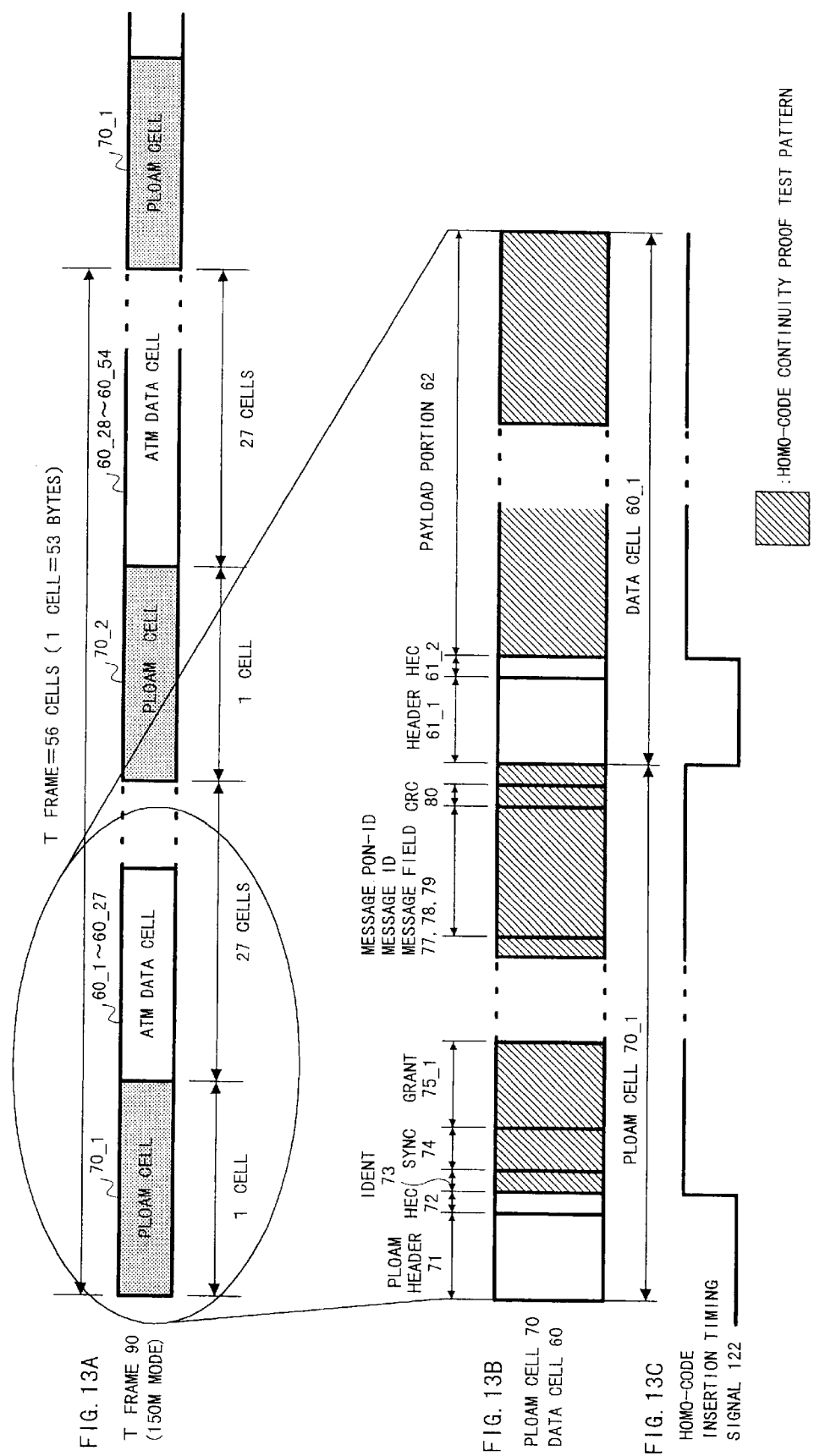
FIGS. 13A–13C are time charts showing insertion timing examples of a homo-code continuity proof test pattern in a multiplexer of a homo-code continuity proof testing device according to the present invention.

FIGS. 13A–13C show insertion timings of the homo-code continuity proof test pattern signal 124. FIG. 13A shows the T frame 90 of the 150M mode in the above-mentioned FIG. 18A, FIG. 13B shows the PLOAM cell 70 and the ATM data cell 60 of FIGS. 17A and 17B, and FIG. 13C shows the homo-code insertion timing signal 122 shown in FIG. 4J.

It is to be noted that the timing signal 122 of FIG. 13C is different from the timing signal 122 of FIG. 4J in that the phase of the PLOAM header 71 is also set to "0". This indicates that the HEC synchronization and the PLOAM synchronization are detected.

When the timing signal 122 of FIG. 13C is "1", the homo-code continuity proof test pattern signal 124 is inserted into the PLOAM cell 70 and the ATM data cell 60 of FIG. 13B (see the hatched portion).

Figure 14:
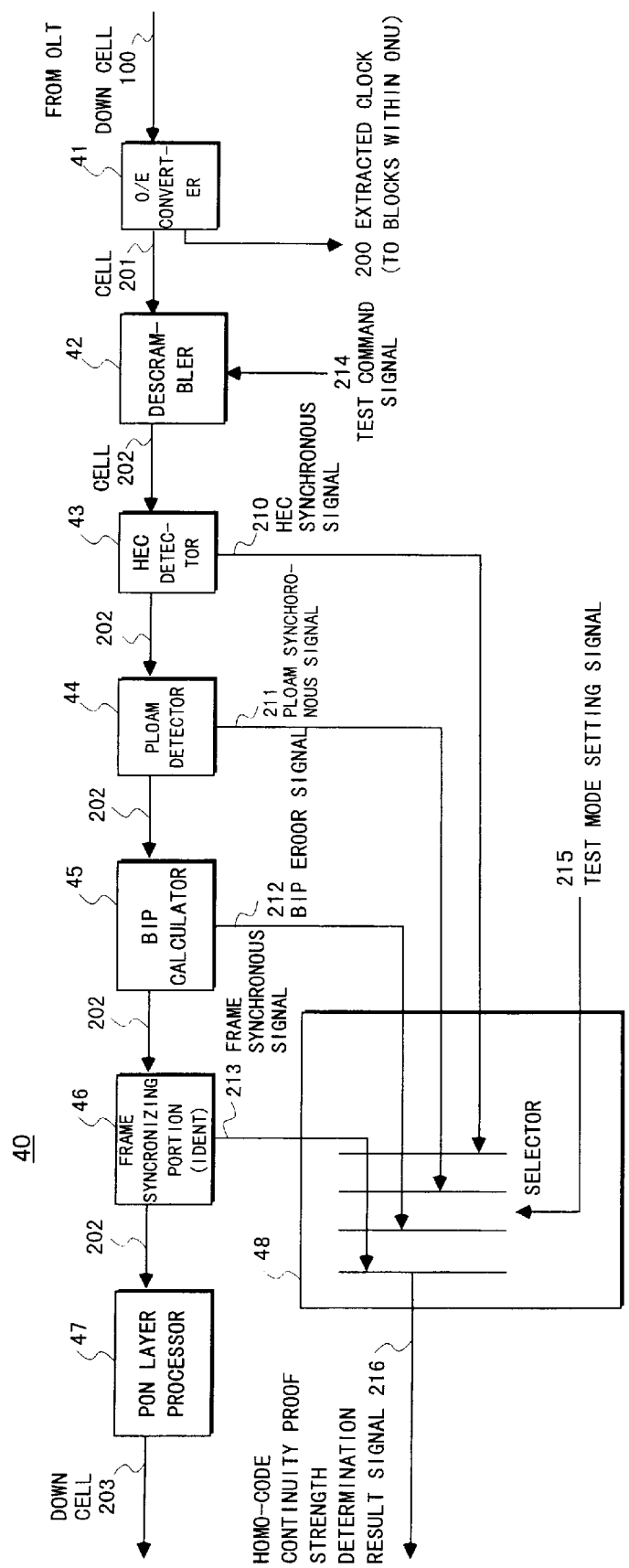
FIG. 14 is a block diagram showing an embodiment of an ONU composing a device on a receiving side in a homo-code continuity proof testing device according to the present invention.

FIG. 14 shows an embodiment of the ONU 40 composing the homo-code continuity proof testing device (tested device).

This ONU 40 includes the O/E converter 41 which converts the down cell 100 from the testing device 10 from the optical signal into the electrical signal to output the cell 201 and the extracted clock 200, and a descrambler 42 which outputs a cell 202 that is the descrambled cell 201 when a test command signal 214 is "0", and which outputs the cell 202 that is not descrambled when the test command signal 214 is "1".

Furthermore, this ONU 40 includes the HEC detector 43, a PLOAM detector 44, the BIP calculator 45, a frame synchronization portion 46, and a PON layer processor 47 which respectively output the HEC synchronous signal 210, the PLOAM synchronous signal 211, the BIP error signal 212, and the frame synchronous signal 213 of the cell 202 to be provided to the homo-code continuity proof test determination portion, i.e. the test mode setting portion 48. The test mode setting portion 48 selects at least one of the input signals 210–213 based on a test mode setting signal 215 from the outside to output the homo-code continuity proof strength determination result signal.

Moreover, the ONU 40 includes the CRC's 76_1–76_4 of the grants 75_1–75_4 and the circuit which calculates the CRC 80 of the message 82 to detect the CRC error (not shown). The homo-code continuity proof strength can be determined by the presence/absence of the CRC error.

FIGS. 15A–15K show operation timings of the ONU 40.

Figure 15:
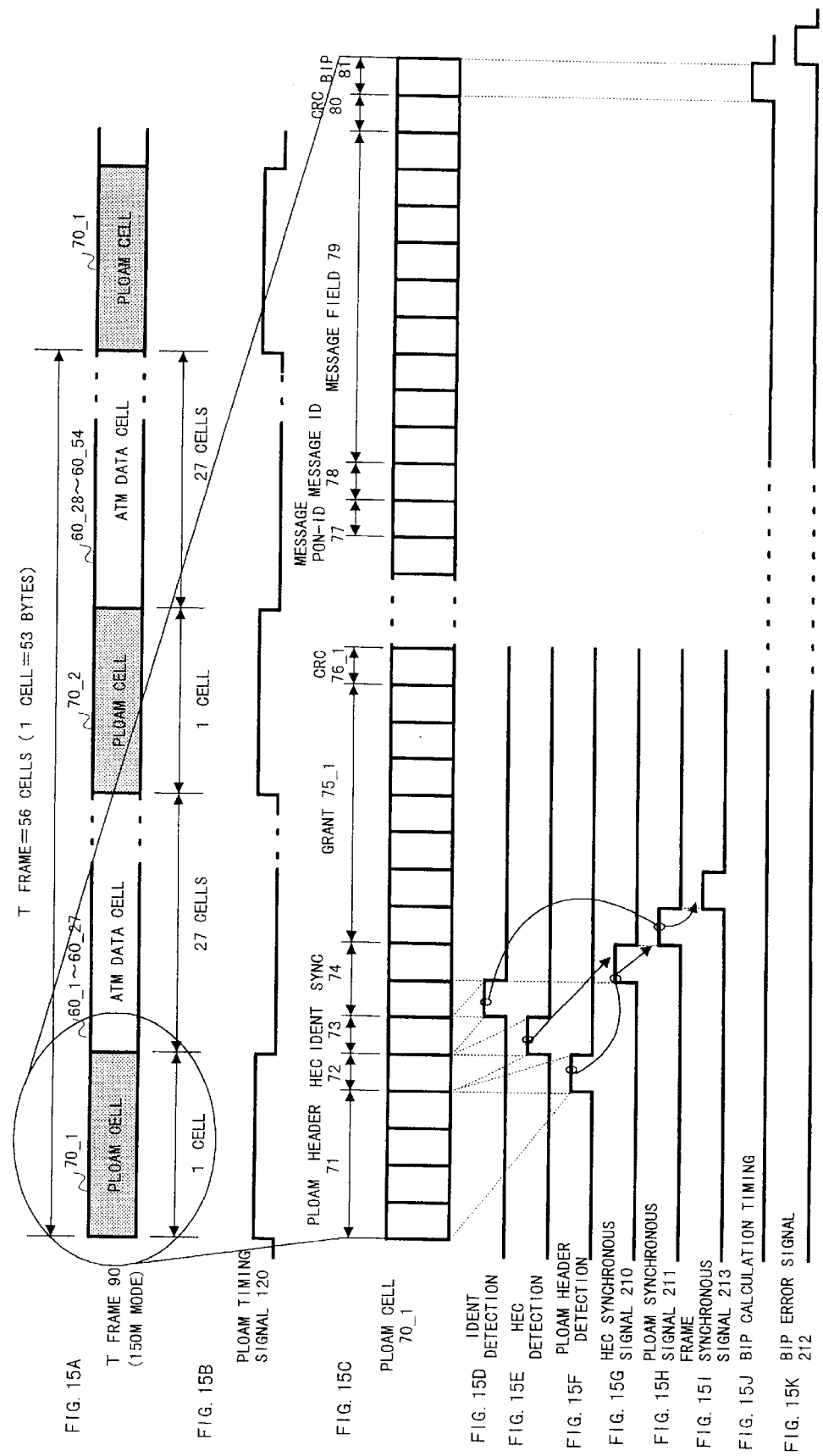
FIGS. 15A–15K are time charts showing operation examples of an ONU of a device on a receiving side in a homo-code continuity proof testing device according to the present invention.
Figure 16:
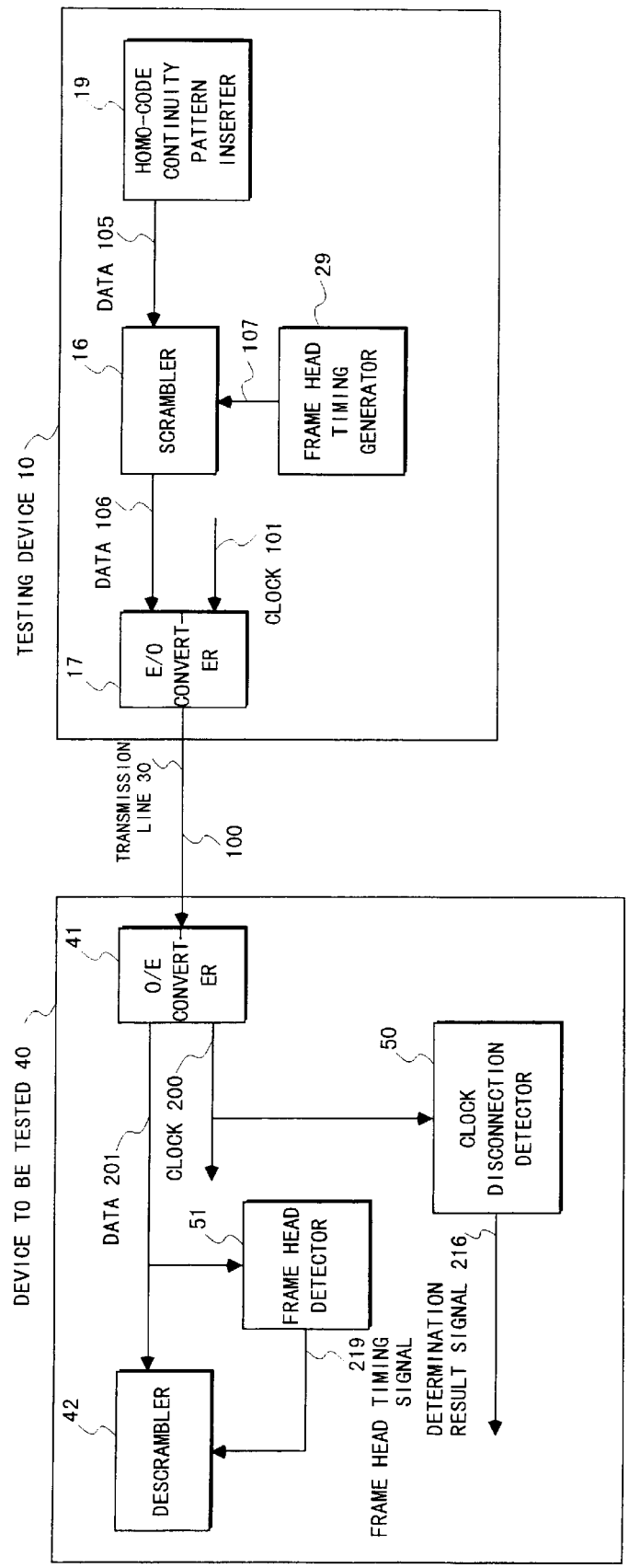
FIG. 16 is a block diagram showing an arrangement of a prior art homo-code continuity proof testing device.

FIGS. 15A–15C show the same signals as the T frame 90 of the 150M mode, the PLOAM timing signal 120, and the PLOAM cell 70 respectively shown in FIGS. 10A, 10B and 10C.

FIGS. 15D–15F respectively show timings of an IDENT detection, an HEC detection, and a PLOAM header detection, and FIGS. 15G–15I respectively show timings when the HEC synchronous signal 210, the PLOAM synchronous signal 211, and the frame synchronous signal 213 are respectively outputted from the HEC detector 43, the PLOAM detector 44, and the frame synchronization portion 46.

The PLOAM header, the HEC detection, and the IDENT detection are outputted respectively by the timings later by a single octet than the phases of the PLOAM header 71, the HEC 72, and the IDENT 73. The HEC synchronous signal 210 is outputted by the PLOAM header detection and the HEC detection. The PLOAM synchronous signal 211 is outputted by the signal 210 and the IDENT detection. The frame synchronous signal 213 is outputted by the signal 211 and the IDENT detection.

FIGS. 15J and 15K respectively show timings by which the BIP calculator performs the BIP calculation and outputs the BIP error signal 212.

The homo-code continuity proof test is performed by selecting at least one of the above-mentioned CRC error detection signal, the synchronous signals 211–213, and the BIP error signal 212 based on the test mode, and by obtaining the homo-code continuity proof strength determination result.

The operations of the OLT 10 and the ONU 40 composing the homo-code continuity proof testing device according to the present invention respectively shown in FIGS. 2 and 14 will now be described.

In the OLT 10, the PLOAM header generator 22 generates the PLOAM header 71 prescribed by the G.983 recommendation, the IDENT generator 23 generates the IDENT signal 73 for detecting the down frame synchronization, the SYNC generator 24 generates the SYNC signal 74 for transmitting the reference signal of 1 KHz to the ONU 40, the grant generator 25 generates the grants 75_1–75_4 for controlling the up bandwidth and the CRC's 76_1–76_4 for protecting the grant, and the message generator 26 generates the message 82 such as a vendor message and the CRC 80 for protecting the message.

The down frame timing generator 27 provides the PLOAM cell assembly portion 11 and the like with the PLOAM byte timing signal 110 for assembling the PLOAM cell. The multiplexer 12 outputs the cell 102 which is the ATM data cell 60 multiplexed with the PLOAM cell. The HEC adder 13 performs the HEC calculation to insert the HEC's 61_2 and 72 by the timing of the HEC timing signal 121.

The multiplexer 14 outputs the cell 104 which is the cell 103 into which the homo-code continuity proof test pattern signal 124 is inserted by the timing of the timing signal 122. The BIP adder 15 performs the BIP calculation between the PLOAM cells, whereby the calculation result is added to the BIP field 81 to be outputted as the cell 104.

Since the test command signal is "1" or "ON", the scrambler 16 does not scramble the cell 105 but outputs the same as it is, i.e. the cell 106. The E/O converter 17 multiplexes the cell 106 and the clock 101, which are converted from the electrical signal into the optical signal as the down cell 100. Then, the down cell 100 is transmitted to the ONU 40 through the transmission line 30.

By the above-mentioned operation, the down cell into which the homo-code continuity proof test pattern is inserted has been transmitted.

In the ONU 40, the O/E converter 41 converts the received down cell 100 from the optical signal into the electrical signal to extract the cell 210 and the clock 200. The extracted clock 200 is provided to the blocks of the ONU 40. Thus, when the clock 200 can not be normally extracted, the miss of synchronization and the error signal occur in the following blocks.

Since the test command signal 214 is "1" or "ON", the descrambler 42 does not descramble the cell 201 but outputs the same as the cell 202. The HEC detector 43 performs the HEC calculation to detect the HEC synchronization. After detecting the HEC synchronization, the PLOAM detector 44 detects the PLOAM cell header to detect the PLOAM cell synchronization.

After the PLOAM synchronization is established, the BIP calculator 45 performs the BIP calculation between the PLOAM cells to output the BIP error when the calculation result is abnormal. The frame synchronization portion 46 detects the frame synchronization by detecting the IDENT byte of the PLOAM cell.

After the establishment of the frame synchronization, the PON layer processor 47 extracts the grant and the message within the PLOAM cell to perform a PON layer process such as a grant analysis and a message analysis.

The operations of the OLT 10 and the ONU 40 will now be described by the following test modes (1)–(5).

(1) Determination of homo-code continuity proof strength based on "HEC synchronization"
(2) Determination of homo-code continuity proof strength based on "BIP error" and "PLOAM synchronization"
(3) Determination of homo-code continuity proof strength based on "BIP error" and "frame synchronization"
(4) In addition to any one of the above (1) to (3), determination of homo-code continuity proof strength when inserting homo-code continuity proof test pattern into payload field
(5) In addition to any one of the above (1) to (3), determination of homo-code continuity proof strength when inserting homo-code continuity proof test pattern into grant field Test Mode (1):

The homo-code insertion timing from the down frame timing generator 27 is made invalid (see FIG. 2 and FIG. 4J) at the phase corresponding to the HEC of the cell to which the HEC is added at the HEC adder 13. While the homo-code insertion timing is invalid, the homo-code continuity proof test pattern is not inserted at the multiplexer 14.

Since the cell per se guarantees the HEC synchronization, the factor of the miss of HEC synchronization in the ONU indicates the abnormality of the extracted clock (see FIG. 14 and FIG. 15G).

Thus, the HEC synchronous signal 210 at the HEC detector 43 on the ONU 40 side can be made the homo-code continuity proof strength test determination result signal 216.

Established HEC synchronization→normal homo-code continuity proof test result
  Missed HEC synchronization→abnormal homo-code continuity proof test result It is to be noted that since the determination of the homo-code continuity proof test is performed by the synchronization or the miss of synchronization, the PLOAM synchronous signal 211, the BIP error signal 212, the frame synchronous signal 213 besides the HEC synchronous signal 210 assume the determination result signal 216 as they are.

Moreover, since the test command signals 125 and 214 indicating the execution of the test are respectively inputted into the scrambler 16 of the OLT 10 and the descrambler 42 of the ONU 40 during the homo-code continuity proof test, neither the scrambling nor the descrambling is performed. This applies to the following test modes (2)–(5).

Test Mode (2):

The homo-code insertion timing from the down frame timing generator 27 is made invalid (see FIG. 2 and FIG. 13C) at the phase corresponding to the PLOAM HEADER and the HEC of the cell to which the HEC is added at the HEC adder 13. While the homo-code insertion timing is invalid, the homo-code continuity proof test pattern is not inserted at the multiplexer 14.

Since the BIP is inserted at the BIP adder 15 after the homo-code continuity proof test pattern is inserted, it never become incorrect (see FIG. 2). For this reason, the PLOAM synchronous signal 211 and the BIP error signal 212 become abnormal in the ONU 40 (see FIG. 14 and FIGS. 15H and 15K).

Thus, the BIP error signal 212 of the ONU 40 can be regarded as the determination result signal 216.

Established PLOAM synchronization without BIP error→normal homo-code continuity proof test result
  Missed PLOAM synchronization with BIP error→abnormal homo-code continuity proof test result Test Mode (3):

The homo-code insertion timing from the down frame timing generator 27 is made invalid at the phase corresponding to the PLOAM HEADER, the HEC, and the IDENT of the cell to which the HEC is added at the HEC adder 13. While the homo-code insertion timing is invalid, the homo-code continuity proof test pattern is not inserted at the multiplexer 14 (see FIG. 2).

Since the BIP is inserted at the BIP adder 15 after the homo-code continuity proof test pattern is inserted, it never become incorrect.

For this reason, the BIP error signal 212 and the frame synchronous signal 213 of the ONU 40 become abnormal. Thus, the BIP error signal 212 of the ONU 40 can be regarded as the determination result signal 216 (see FIG. 14 and FIGS. 15I and 15K).

Established frame synchronization without BIP error→normal homo-code continuity proof test result Missed frame synchronization with BIP error→abnormal homo-code continuity proof test result Test Mode (4):

In addition to any one of the test modes (1) to (3), the homo-code insertion timing from the down frame timing generator 27 is made valid at the phase corresponding to the payload field 62 of the cell to which the HEC is added at the HEC adder 13. While the homo-code insertion timing is valid, the homo-code continuity proof test pattern is inserted at the multiplexer 14 (see FIG. 2 and FIG. 13C).

Thus, an accurate determination can be performed at the ONU 40 by making e.g. the HEC synchronous signal 210 the homo-code continuity proof strength determination result signal 216 (see FIG. 14).

It is to be noted that the transmission of the test pattern conformed to the ITU-T recommendation G.983 can be performed by inserting the all-"1" and PN signal into the payload field 62 of the first cell, the all-"0" and PN signal into the next cell, and similar data sequentially and alternately into the following cells.

Test Mode (5):

As for the PLOAM cell, in addition to any one of test modes (1) to (3), the homo-code insertion timing from the down frame timing generator 27 is made invalid at the phase corresponding to the payload field of the PLOAM cell to which the HEC is added at the HEC adder 13. While the homo-code insertion timing is invalid, the homo-code continuity proof test pattern is not inserted at the multiplexer 14.

The grant value setting portion of the grant generator 25 is set in the test pattern, the grant field of the PLOAM cell is made the test pattern, and the CRC for the grant protection is added to be transmitted. The PLOAM cell is inserted into the multiplexer 12 with the interval of a single cell of 27 ATM cells.

Thus, the ONU 40 can determine the homo-code continuity proof strength by the calculation result of the grant CRC.

In case of the message field and the vendor message, the homo-code continuity proof strength can be determined by the CRC calculation result of the message CRC.

As described above, a homo-code continuity proof testing device according to the present invention is arranged such that a testing device on a transmitting side synchronizes test data, including a predetermined test pattern and an error detecting pattern for testing a data synchronous pattern and a homo-code continuity proof strength, with a predetermined clock, to be transmitted, a tested device on the receiving side extracts the clock included in the test data, detects the data synchronous pattern in synchronization with the extracted clock, and a homo-code continuity proof test is determined by the presence/absence of the data synchronous pattern. Therefore, the homo-code continuity proof test with a definite determination reference and a high determination accuracy can be performed without using a complicated circuit.

Also, if a homo-code continuity proof testing device according to the present invention is arranged such that the testing device on the transmitting side adds an error detecting pattern for detecting the error to the test data, the tested device on the receiving side calculates the presence/absence of the test data error in synchronization with the clock, and the homo-code continuity proof test is determined based on the calculation result, the same effect can be obtained.

Also, if a homo-code continuity proof testing device according to the present invention is arranged such that a plurality of test data compose a frame, a frame synchronous pattern is inserted into the frame, the frame is synchronized, with the predetermined clock, to be transmitted in the testing device on the transmitting side, the tested device on the receiving side detects the frame synchronous pattern in synchronization with the extracted clock, and the homo-code continuity proof test is determined by the presence/ absence of the frame synchronous pattern detection, the same effect can be obtained.

Also, if a homo-code continuity proof testing device according to the present invention is arranged such that the testing device on the transmitting side does not scramble the test data to be transmitted upon testing, the tested device on the receiving side receives the test data without descrambling on testing, the homo-code continuity proof test can be performed without using the complicated circuit.

Furthermore, the homo-code continuity proof testing device according to the present invention can be arranged by an OLT and an ONU conformed to the ITU-T recommendation G.983.

What we claim is:

1. A homo-code continuity proof testing device comprising:
   a synchronous pattern inserter which inserts a data synchronous pattern into test data,
   a test pattern inserter which inserts a predetermined test pattern, for testing a homo-code continuity proof strength, into the test data,
   a synchronizing portion which synchronizes the test data, with a predetermined clock, to be transmitted, and
   an error detecting pattern adder which adds an error detecting pattern for detecting an error to the test data.

2. The homo-code continuity proof testing device as claimed in claim 1 wherein the error detecting pattern comprises a BIP.

3. The homo-code continuity proof testing device as claimed in claim 1 wherein the test pattern is inserted into a grant field of a PLOAM cell.

4. The homo-code continuity proof testing device as claimed in claim 1 wherein the error detecting pattern comprises a CRC of a grant.

5. The homo-code continuity proof testing device as claimed in claim 1 wherein the test pattern is inserted into a message field of a PLOAM cell.

6. The homo-code continuity proof testing device as claimed in claim 5 wherein a vendor message is inserted into the message field.

7. The homo-code continuity proof testing device as claimed in claim 1 wherein the error detecting pattern comprises a CRC of a message.

8. A homo-code continuity proof testing device comprising:
   a clock extractor which receives test data including a predetermined test pattern for testing a data synchronous pattern and a homo-code continuity proof strength to extract a clock included in the test data,
   a data synchronization detector which detects the data synchronous pattern in synchronization with the clock, and
   a homo-code continuity proof test determining portion which determines a homo-code continuity proof test based on a detection result of the data synchronous pattern.

9. The homo-code continuity proof testing device as claimed in claim 8 wherein the test data includes an error detecting pattern for detecting an error, the device further comprising:

an error calculator which calculates a presence/absence of an error of the test data in synchronization with the clock, the test determining portion determining the homo-code continuity proof test based on a calculating result of the error calculator.

10. The homo-code continuity proof testing device as claimed in claim 9 wherein the error detecting pattern comprises a BIP.

11. The homo-code continuity proof testing device as claimed in claim 9 wherein the error detecting pattern comprises a CRC of a grant.

12. The homo-code continuity proof testing device as claimed in claim 9 wherein the error detecting pattern comprises a CRC of a message field.

13. The homo-code continuity proof testing device as claimed in claim 8 wherein a plurality of test data compose a frame including a frame synchronous pattern, the device further comprising:

a frame synchronization detector which detects the frame synchronous pattern in synchronization with the clock, the test determining portion determining the homo-code continuity proof test based on the detection result of the frame synchronous pattern.

14. The homo-code continuity proof testing device as claimed in claim 13 wherein the frame synchronous pattern comprises an IDENT of a PLOAM cell.

15. The homo-code continuity proof testing device as claimed in claim 13 wherein the frame synchronous pattern comprises an IDENT of a PLOAM cell.

16. The homo-code continuity proof testing device as claimed in claim 8, further comprising a descrambler which descrambles the test data but does not descramble the test pattern upon testing.

17. The homo-code continuity proof testing device as claimed in claim 8 wherein the data synchronous pattern comprises an HEC of at least one of a data cell and a PLOAM cell.

18. The homo-code continuity proof testing device as claimed in claim 8 wherein the data synchronous pattern comprises a PLOAM header of a PLOAM cell.

19. The homo-code continuity proof testing device as claimed in claim 8 wherein the test pattern is inserted into a grant field of a PLOAM cell.

20. The homo-code continuity proof testing device as claimed in claim 8 wherein the test pattern is inserted into a message field of a PLOAM cell.

21. The homo-code continuity proof testing device as claimed in claim 20 wherein a vendor message is inserted into the message field.

22. The homo-code continuity proof testing device as claimed in claim 8 wherein the test pattern is conformed to the ITU-T recommendation G.983.

23. A homo-code continuity proof testing device comprising:

a scrambler which scrambles transmitting data, a synchronous pattern inserter which inserts a data synchronous pattern into the transmitting data, a test pattern inserter which inserts a predetermined test pattern for testing a homo-code continuity proof strength into the transmitting data, and a synchronizing portion which synchronizes the transmission data, with a predetermined clock, to be transmitted, the scrambler not scrambling the test pattern.

* * * * *